(12) United States Patent
Bowers et al.

(10) Patent No.: US 10,152,442 B2
(45) Date of Patent: Dec. 11, 2018

(54) MULTI-FUNCTION PORTS ON A COMPUTING DEVICE

(71) Applicant: GOOGLE INC., Mountain View, CA (US)

(72) Inventors: Andrew Bowers, San Francisco, CA (US); James Tanner, Los Gatos, CA (US); Joseph Edward Clayton, San Francisco, CA (US); Mark D. Hayter, Menlo Park, CA (US); Christopher Lyon, Santa Clara, CA (US); David Ness Schneider, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 172 days.

(21) Appl. No.: 14/634,352

(22) Filed: Feb. 27, 2015

(65) Prior Publication Data
US 2016/0253282 A1 Sep. 1, 2016

(51) Int. Cl.
*G06F 13/40* (2006.01)
*G06F 13/10* (2006.01)

(52) U.S. Cl.
CPC ........ *G06F 13/4022* (2013.01); *G06F 13/102* (2013.01)

(58) Field of Classification Search
CPC .................................................. G06F 13/4022
(Continued)

(56) References Cited

U.S. PATENT DOCUMENTS 6,388,658 B1 * 5/2002 Ahern ................ G06F 13/4022
345/1.1
6,592,397 B2 7/2003 Pocrass
(Continued)

FOREIGN PATENT DOCUMENTS

CN 204155270 U 2/2015
EP 2711843 A1 3/2014
(Continued)

OTHER PUBLICATIONS

International Search Report and Written Opinion received for PCT Patent Application No. PCT/US2016/018889, dated Oct. 10, 2016, 17 pages.
(Continued)

*Primary Examiner* — Christopher Shin
(74) *Attorney, Agent, or Firm* — Brake Hughes Bellermann LLP

(57) ABSTRACT

In one general aspect, a method can include determining an orientation of a plug inserted into a connector included in the computing device, providing a plurality of display data signals to a reordering switch included in the computing device, selecting, by the reordering switch and based on the determined orientation of the plug, a display data signal from the plurality of display data signals, providing the selected display data signal to at least one of a plurality of multiplexers, the plurality of multiplexers being orientated back-to-back, providing a data signal to the at least one of the plurality of multiplexers, enabling the at least one of the plurality of multiplexers, selecting the display data signal for output by the at least one of the plurality of multiplexers, and providing the selected display data signal to a contact included on the connector.

26 Claims, 13 Drawing Sheets

(58) Field of Classification Search
USPC .......................................................... 710/316
See application file for complete search history.

(56) References Cited

U.S. PATENT DOCUMENTS

| | | | |
|---|---|---|---|
| 6,658,516 | B2 | 12/2003 | Yao |
| 6,775,715 | B2 | 8/2004 | Spitaels et al. |
| 6,939,177 | B2 | 9/2005 | Kato et al. |
| 7,746,310 | B2 | 6/2010 | Ahn |
| 8,717,759 | B2 | 5/2014 | Crosby et al. |
| 8,762,605 | B2 | 6/2014 | Terlizzi et al. |
| 9,218,311 | B2 | 12/2015 | Kobayashi |
| 2004/0212737 | A1* | 10/2004 | Hsu ........................ H04N 9/76 348/584 |
| 2005/0025097 | A1* | 2/2005 | Paneth .................. H04L 1/0003 370/330 |
| 2007/0159555 | A1* | 7/2007 | Chen ...................... H04N 5/775 348/552 |
| 2009/0009495 | A1 | 1/2009 | Jeon et al. |
| 2011/0043579 | A1 | 2/2011 | Leppanen et al. |
| 2012/0030622 | A1* | 2/2012 | Hasegawa ............. G06F 3/0482 715/811 |
| 2012/0203937 | A1 | 8/2012 | Mohanty et al. |
| 2012/0327298 | A1* | 12/2012 | Navarro ................ G06F 3/1423 348/441 |
| 2013/0275629 | A1 | 10/2013 | Hall |
| 2013/0332642 | A1* | 12/2013 | Capezza ............. G06F 13/4081 710/304 |
| 2014/0129738 | A1 | 5/2014 | Hussain |
| 2014/0141635 | A1 | 5/2014 | Saunders et al. |
| 2014/0327630 | A1 | 11/2014 | Burr et al. |
| 2015/0137861 | A1 | 5/2015 | Cornelius et al. |
| 2015/0162311 | A1 | 6/2015 | Bartley et al. |
| 2015/0208026 | A1* | 7/2015 | Lai ..................... H04N 21/4183 348/441 |
| 2015/0269102 | A1 | 9/2015 | Inha et al. |
| 2016/0062924 | A1* | 3/2016 | Lee ....................... G06F 13/102 710/14 |
| 2016/0110305 | A1* | 4/2016 | Hundal ............... G06F 13/4022 710/316 |
| 2016/0156137 | A1* | 6/2016 | Pan ....................... G06F 13/385 439/78 |
| 2016/0187420 | A1 | 6/2016 | Trethewey et al. |
| 2016/0191313 | A1* | 6/2016 | Chen ....................... H04L 12/12 370/315 |
| 2016/0253283 | A1* | 9/2016 | Bowers ............... G06F 13/4221 |

FOREIGN PATENT DOCUMENTS

| | | |
|---|---|---|
| GB | 2552906 A | 2/2018 |
| JP | 2003280616 A | 10/2003 |
| JP | 2015507243 A | 3/2015 |
| JP | 2015512545 A | 4/2015 |
| JP | 6310619 B2 | 3/2018 |
| KR | 20090004170 A | 1/2009 |
| WO | 2009/118582 A1 | 10/2009 |
| WO | 2013082313 A2 | 6/2013 |
| WO | 2016/137873 A2 | 9/2016 |

OTHER PUBLICATIONS

Invitation to Pay Additional Fees and Partial Search Report received for PCT Patent Application No. PCT/US2016/018889, dated Jul. 12, 2016, 6 pages.
U.S. Appl. No. 14/634,330, filed Feb. 27, 2015, titled "Multi-Function Ports on a Computing Device".
Non Final Office Action for U.S. Appl. No. 14/634,330, dated Feb. 10, 2017, 31 pages.
"How to Connect Your Android Phone to Your TV", retrieved on Feb. 26, 2015 from http://www.howtogeek.com/201822/howtoconnectyourandroidphonetoyourtv/, 4 pages.
"VESA DisplayPort Alt Mode for USB Type-•—C Standard", Feature Summary, Sep. 22, 2014, 17 pages.
Non Final Office Action for U.S. Appl. No. 14/634,330, dated Aug. 25, 2017, 18 pages.
Examination Report from Appn. No. GB1714400.7, dated Dec. 1, 2017, 5 pages.
First Office Action with English Translation for Korean Application No. 10-2017-7027563, dated Apr. 27, 2018, 10 pages.
Office Action for German Application No. 112016000928.3, dated Jun. 7, 2018, 6 pages.

* cited by examiner

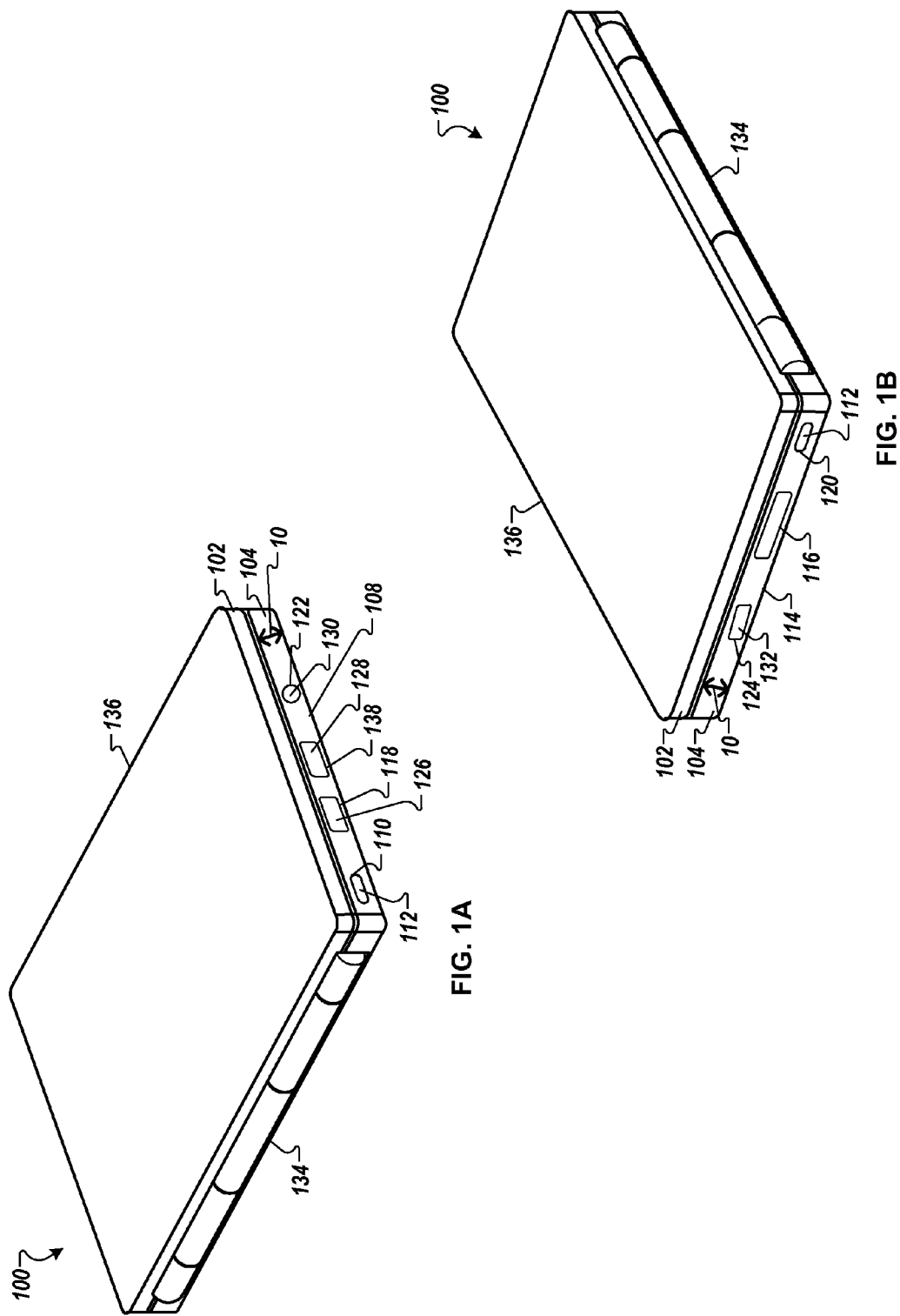

MULTI-FUNCTION PORTS ON A COMPUTING DEVICE

TECHNICAL FIELD

This description generally relates to computing devices. The description, in particular, relates to the use and placement of multi-function ports on a computing device.

BACKGROUND

Electrical connectors can transmit data, signals, and/or power to and between electrical devices, such as computing devices. The computing devices may include portable computing devices such as laptop or notebook computers, tablets, netbooks, or smartphones. The computing devices may include desktop computers. Cables can include connectors on both ends that can connect power and/or data between the electrical devices. In many cases, a computing device can include multiple connectors that can be connected to respective cables that can provide data, signals, and/or power to the computing device from other computing devices and/or sources.

SUMMARY

In one general aspect, a method for providing signals to contacts on a connector included in a computing device can include determining an orientation of a plug inserted into a connector included in the computing device, providing, by a display controller included in the computing device, a plurality of display data signals to a reordering switch included in the computing device, selecting, by the reordering switch and based on the determined orientation of the plug, a display data signal from the plurality of display data signals, providing, by the reordering switch, the selected display data signal to at least one of a plurality of multiplexers, the plurality of multiplexers being orientated back-to-back, providing, by a data controller included in the computing device, a data signal to the at least one of the plurality of multiplexers, enabling the at least one of the plurality of multiplexers, selecting the display data signal for output by the at least one of the plurality of multiplexers, and providing, by the at least one of the plurality of multiplexers, the display data signal to a contact included on the connector.

Example implementations may include one or more of the following features. For instance, selecting, by the reordering switch and based on the determined orientation of the plug, a display data signal from the plurality of display data signals can include selecting a respective display data signal from the plurality of display data signals to provide to each of the plurality of multiplexers. Providing, by the reordering switch, the selected display data signal to the at least one of the plurality of multiplexers can include providing a respective display data signal to each of the plurality of multiplexers. Enabling the at least one of the plurality of multiplexers can include enabling each of the plurality of multiplexers. Selecting the display data signal for output by the at least one of the plurality of multiplexers can include selecting the respective display data signal for output by each of the plurality of multiplexers. Providing, by the at least one of the plurality of multiplexers, the display data signal to a contact included on the connector can include providing the respective display data signals to a respective contact included on the connector. The connector can be a Universal Serial Bus (USB) Type-C connector, and the method can further include configuring the connector to operate in a full DisplayPort Alternate mode. Selecting, by the reordering switch and based on the determined orientation of the plug, a display data signal from the plurality of display data signals can include selecting a respective display data signal from the plurality of display data signals to provide to each of the plurality of multiplexers. Providing, by the reordering switch, the selected display data signal to the at least one of the plurality of multiplexers can include providing respective display data signals to each of the plurality of multiplexers. Providing, by a data controller included in the computing device, a data signal to the at least one of the plurality of multiplexers can include providing respective data signals to each of the plurality of multiplexers. Enabling the at least one of the plurality of multiplexers can include enabling each of the plurality of multiplexers. The method can further include selecting respective data signals for output by a first set of the plurality of multiplexers. The method can further include providing, by each multiplexer included in the first set of the plurality of multiplexers, the respective data signals to respective contacts included in the connector based on the determined orientation of the plug. Selecting, by the reordering switch and based on the determined orientation of the plug, a display data signal from the plurality of display data signals can include selecting respective display data signals to provide to a second set of the plurality of multiplexers. Providing, by the reordering switch, the selected display data signal to at least one of a plurality of multiplexers can include providing a respective display data signal to a respective multiplexer included in the second set of multiplexers. Providing, by the at least one of the plurality of multiplexers, the display data signal to a contact included on the connector can include providing the respective display data signals to respective contacts included in the connector. The connector can be a Universal Serial Bus (USB) Type-C connector, and the method can further include configuring the connector to operate in a DisplayPort Alternate mode and a high-speed USB data mode. Providing the respective data signals to respective contacts included in the a connector can include providing the respective data signals to respective contacts on a first connector incorporated into a first multipurpose port located on a first side of the computing device. Providing the respective display data signals to contacts included in the connector can include providing the respective display data signals to respective contacts on a second connector incorporated into a second multipurpose port located on a second side of the computing device, the second side being opposite to the first side. The method can further include configuring the first connector to provide one or more of power, high-speed data, and display data. The method can further include configuring the second connector to provide one or more of power, high-speed data, and display data. Configuring the first connector to provide one or more of power, high-speed data, and display data can include configuring the first connector to provide high-speed data to a first peripheral device connected to the computing device by way of the first connector. Configuring the second connector to provide one or more of power, high-speed data, and display data can include configuring the second connector to provide display data to a second peripheral device connected to the computing device by way of the second connector. The first peripheral device can be a mobile computing device and the second peripheral device can be a display device. The first connector and the second connector can be Universal Serial Bus (USB) Type-C connectors, and the computing device can configure the second connector to operate in a DisplayPort Alternate mode. A connector included in the first peripheral device and a connector included in the second peripheral device can be of a same type of connector as the first connector and the second connector. A peripheral device can include a connector, the peripheral device can be connected to the computing device by way of the connector included in the computing device, and the connector included in the peripheral device can be of a different type than a type of connector for the connector included in the computing device. The peripheral device can be a display device. The peripheral device can be connected to the computing device by way of the connector included in the computing device, and the peripheral device can provide power to the computing device. The connector included in the computing device can be configured to receive the power provided by the peripheral device.

In another general aspect, a computing device can include a plurality of multiplexers, a reordering switch coupled to the plurality of multiplexers, a display controller coupled to the reordering switch, a data controller coupled to the plurality of multiplexers, and a connector coupled to the plurality of multiplexers. The display controller can provide a plurality of display data signals to the reordering switch. The reordering switch can provide at least one of the plurality of display data signals to at least one of the plurality of multiplexers. The data controller can provide at least one data signal to at least one of the plurality of multiplexers. The at least one of the plurality of multiplexers can provide the at least one display data signal to a respective at least one contact included on the connector.

Example implementations may include one or more of the following features. For instance, the plurality of multiplexers can include four multiplexers. The reordering switch can provide a respective display data signal to each of the four multiplexers. Each of the four multiplexers can provide the respective display data signal to a respective contact included on the connector. The computing device can further include configuration logic that detects an orientation of a plug inserted into the connector, provides a signal indicative of the orientation of the plug to each of the plurality of multiplexers, and provides a signal indicative of the orientation of the plug to the reordering switch. The connector can be a Universal Serial Bus (USB) Type-C connector, and the computing device can configure the connector to operate in a full DisplayPort Alternate mode. The computing device can further include a reordering switch. The plurality of multiplexers can include four multiplexers. The display controller can provide a respective display data signal to each of the four multiplexers by way of the reordering switch. The data controller can provide a respective data signal to each of the four multiplexers. Each of the four multiplexers can provide either the display data signal or the data signal to a contact on the connector. Each of the four multiplexers can include a respective select input and a respective enable input, and providing by each of the four multiplexers either the display data signal or the data signal can be determined by a value for the respective select input and a value for the respective enable input for the respective multiplexer. A first two of the four multiplexers can provide a respective display data signal to a first contact on the connector, and a second two of the four multiplexers can provide a respective data signal to a second contact on the connector. The connector can be a Universal Serial Bus (USB) Type-C connector, and the computing device can configure the connector to operate in a DisplayPort Alternate mode and a high-speed USB data mode. The plurality of multiplexers can include a first multiplexer, a second multiplexer, a third multiplexer, and a fourth multiplexer. The first multiplexer can be located above the second multiplexer. The third multiplexer can be located above the fourth multiplexer. The first multiplexer and the second multiplexer can be placed back-to-back with the third multiplexer and the fourth multiplexer.

In yet another general aspect, a non-transitory, machine-readable medium having instructions stored thereon, the instructions, when executed by a processor, can cause a computing device to determine an orientation of a plug inserted into a connector included in the computing device, provide, by a display controller included in the computing device, a plurality of display data signals to a reordering switch included in the computing device, select, by the reordering switch and based on the determined orientation of the plug, a display data signal from the plurality of display data signals, provide, by the reordering switch, the selected display data signal to at least one of a plurality of multiplexers, the plurality of multiplexers being orientated back-to-back, provide, by a data controller included in the computing device, a data signal to the at least one of the plurality of multiplexers, enable the at least one of the plurality of multiplexers, select the display data signal for output by the at least one of the plurality of multiplexers, and provide, by the at least one of the plurality of multiplexers, the display data signal to a contact included on the connector.

Example implementations may include one or more of the following features. For instance, selecting, by the reordering switch and based on the determined orientation of the plug, a display data signal from the plurality of display data signals Can include selecting a respective display data signal from the plurality of display data signals to provide to each of the plurality of multiplexers. Providing, by the reordering switch, the selected display data signal to the at least one of the plurality of multiplexers can include providing a respective display data signal to each of the plurality of multiplexers. Enabling the at least one of the plurality of multiplexers can include enabling each of the plurality of multiplexers. Selecting the display data signal for output by the at least one of the plurality of multiplexers can include selecting the respective display data signal for output by each of the plurality of multiplexers. Providing, by the at least one of the plurality of multiplexers, the display data signal to a contact included on the connector can include providing the respective display data signals to a respective contact included on the connector.

The details of one or more implementations are set forth in the accompanying drawings and the description below. Other features will be apparent from the description and drawings, and from the claims.

BRIEF DESCRIPTION OF THE DRAWINGS

FIG. 1A is a diagram that illustrates an example computing device shown from a first perspective.

FIG. 1B is a diagram that illustrates an example computing device shown from a second perspective.

Like reference symbols in the various drawings indicate like elements.

DETAILED DESCRIPTION

Figure 1C:
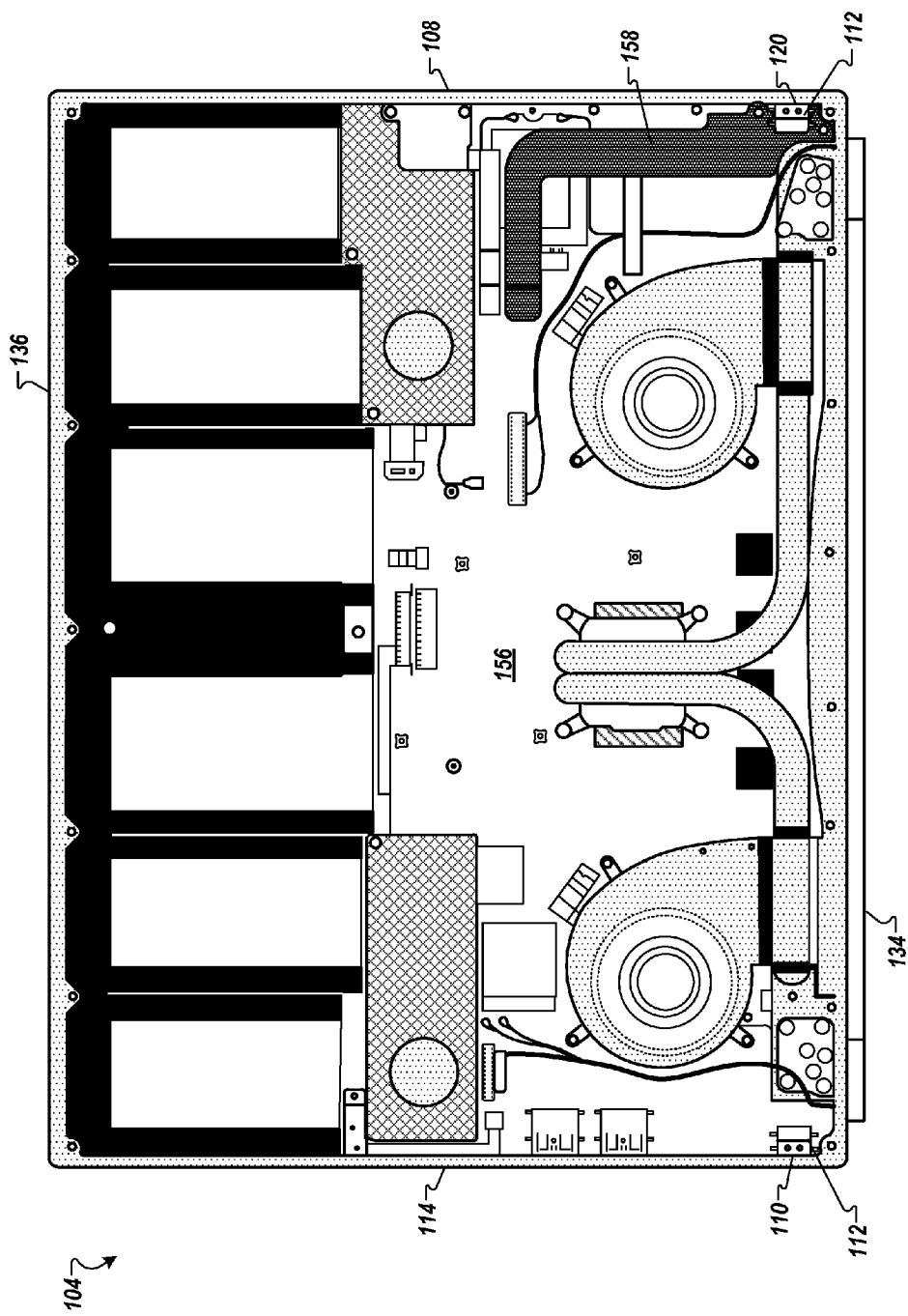
FIG. 1C is a block diagram of electrical components included in the base portion of the computing device.

Computing devices can include, but are not limited to, laptop computers, notebook computers, tablets, netbooks, smartphones, personal digital assistants, desktop computers, mobile phones, and mobile computing devices. A computing device can include multiple connectors or receptacles incorporated into multiple ports or sockets included on the computing device. The connector or receptacle can interface with/connect to cables and/or devices that include a connector or plug that properly mates with/connects to the type of connector or receptacle included in the computing device. In some implementations, a computing device can include multiple different types of connectors. The multiple different types of connectors can include, but are not limited to, Universal Serial Bus (USB) connectors, Ethernet connectors (e.g., RJ 45 connector), microphone/headphone ports, power jacks or connectors, and video connectors (e.g., DisplayPort connectors, DVI-D connectors, HD15 connectors, and High-Definition Multimedia Interface (HDMI) connectors).

In many cases, a computing device can include more than one of a particular type of connector (e.g., multiple USB connectors) placed at various locations on the computing device (e.g., sides, top, rear, bottom) dependent on the type of computing device. For example, a laptop computer can include connectors on either side of the base of the laptop. In addition, or in the alternative, a laptop computer can include connectors on the rear of the computer. A desktop computer can include connectors on the rear, front and top of the computer. A mobile computing device (e.g., a smartphone) can include connectors along the sides of the mobile computing device.

Designers of computing devices are faced with the challenge of accessing the tradeoffs of cost, usefulness, and convenience, against providing an aesthetically pleasing computing device when deciding how many connectors and ports to include on the computing device and where to place the connectors and ports on the computing device. The number and location of the ports can be based on, for example, the type of computing device and the desired cost of the computing device. It can be difficult to support a wide variety of use cases and workspace layouts for the computing device in a single design of the computing device.

For example, each user of the same type of computing device (and even the same computing device) may have their own preferences for how to setup a workspace. For example, the workspace may be limited in size. Each user may have different types and sizes of peripheral devices. Because of the number and variety of workspace configurations, each user may have a preference for which side of the computing device they would prefer to connect a peripheral device.

For example, based on a workspace configuration (e.g., a desk in an office), a user may prefer (and find it easier, neater, and more aesthetically pleasing) to place a peripheral device (e.g., an external monitor, a printer) on the right side of the computing device (e.g., a laptop computing device). When the user sets up a workspace at home that incorporates the computing device (e.g., the laptop computing device) the user may prefer to place a peripheral device (e.g., an external monitor, a printer) on the left side of the computing device (e.g., the laptop computing device). The user, in some cases, may not be able to configure a workspace as desired due to the location of the appropriate connector on the computing device relative to the location of the peripheral device. In some cases, a cable that connects the peripheral device and the computing device may need to be placed in an inconvenient and/or awkward location in the workspace, interfering with the placement of other peripheral devices in the workspace.

In some implementations, a computing device can include duplicates of particular types of connectors so that a user can place and easily connect a peripheral device to the computing device because the user can place the peripheral device, for example, on either side of the computing device. In these implementations, the inclusion of many different types of connectors can add to the cost of the computing device. In addition, or in the alternative, the inclusion of many different types of connectors can impact the size of the computing device dependent on the number and type of connectors.

In some implementations, a computing device can include one or more multi-purpose ports that can be implemented using a single type of connector that can accept and/or deliver power, data and display information. For example, a multi-purpose port can be placed on either side of a computing device. In these implementations, an external peripheral device that can connect to/interface with the computing device can be easily and conveniently placed on either side of the computing device when a user is configuring a workspace. This allows a user greater flexibility when configuring a workspace.

FIG. 1A is a diagram that illustrates an example computing device 100 shown from a first perspective. The computing device 100 is shown FIG. 1A in a closed position and from a first side view (a lid portion 102 is placed above and substantially in contact with a base portion 104). A first side 108 of the base portion 104 of the computing device 100 can include a multi-purpose port 110 that can be implemented using a single type of connector 112. For example, the connector 112 can be implemented as shown in more detail with reference to FIGS. 5A-B.

FIG. 1B is a diagram that illustrates an example computing device 100 shown from a second perspective. The computing device 100 is shown in FIG. 1B in a closed position and from a second side view (the lid portion 102 is placed above and substantially in contact with the base portion 104). A second side 114 of the base portion 104 of the computing device 100 can include a multi-purpose port 120 that can be implemented using the single type of connector 112. For example, the connector 112 is shown in more detail with reference to FIGS. 5A-B.

As shown in FIGS. 1A and 1B, the computing device 100 can include additional ports 118, 138, 122, and 124 that can incorporate other types of connectors 126, 128, 130, and 132, respectively, that may be different from the single type of connector 112. In some implementations, the computing device may not include the additional ports 124 and the respective connector 132. The computing device may also include a slot 116 that can accept, for example, an external memory card. In a non-limiting example, the computing device 100 can be a laptop computer, a desktop computer system, or a notebook computer.

Though FIGS. 1A and 1B show the same type of connector used in two multi-purpose ports (the multipurpose port 110 and the multipurpose port 120) located on each side of a computing device (e.g., the computing device 100), other implementations could include different placement of the two multi-purpose ports on the computing device. For example, FIGS. 1A and 1B show the multi-purpose port 110 and the multi-purpose port 120 located close to a back end 134 (the rear) of the computing device 100. A multi-purpose port can be located at any location along the first side 108 of the base portion 104 of the computing device 100 (e.g., close to a front end 136 (the front) of the computing device 100). A multi-purpose port can be located at any location along the second side 114 of the base portion 104 of the computing device 100 (e.g., close to the front end 136 of the computing device 100). In some implementations, one multi-purpose port (e.g., the multipurpose port 110) can be located close to the back end 134 (the rear) of the computing device 100 and another multipurpose port (e.g., the multipurpose port 120) can be located close to the front end 136 (the front) of the computing device 100).

Though FIGS. A and 1B show the two multipurpose ports (the multipurpose port 110 and the multipurpose port 120) located on each side of a computing device (e.g., the computing device 100), other implementations could include more than two multipurpose ports on the computing device. For example, each side of the computing device 100 (the first side 108 of the base portion 104 and the second side 114 of the base portion 104) can include more than one multipurpose port. Each multipurpose port included on the computing device 100 would incorporate the same type of connector.

Each multipurpose port (the multipurpose port 110 and the multipurpose port 120) can include a particular type of connector such as, for example, a USB Type-C connector. The use of a USB Type-C connectors can provide for a thin profile for incorporating the connector (receptacle) into the base portion of the computing device 100, allowing a height 10 of the base portion 104 to be, for example, less than six millimeters.

In some implementations, other types of connectors that can support one or more functions can be incorporated into multipurpose ports of a computing device. The functions can include, but are not limited to, transmitting and receiving high speed, secure data, providing or receiving data signals for a display (monitor) connection, supplying or delivering power, and charging of a battery included in the computing device.

A cable with appropriate connectors or plugs included on each end of the cable can connect/interface a peripheral to the computing device. A first end of a cable can include a connector or plug that can interface with, connect, or plug into a connector included in a multipurpose port of the computing device. A second end of the cable can include a connector or plug that can interface with, connect, or plug into a connector included in a multipurpose port of the peripheral device. In some implementations, the connector included in the multipurpose port of the computing device and the connector included in the multipurpose port of the peripheral device are the same type of connector (e.g., a USB Type-C connector).

In some implementations, the peripheral device may include a connector that is not incorporated into a multipurpose port. In these implementations, the peripheral device may be connected to the connector incorporated into the multipurpose port of the computing device using an adapter cable. The adapter cable can provide the appropriate connectors or plugs on either end of the cable that can connect, interface with, or plug into the computing device and the peripheral device. In addition, the adapter cable can ensure the correct electrical wiring of signals from the computing device to the peripheral device by way of the different connectors. In these implementations, an adapter cable can be used in those cases where there is compatibility between signals provided/transported/carried by the contacts or pins included in the type of connector incorporated into the multipurpose port and the type of connector included in the port of the peripheral device. This will be described in more detail with reference to FIGS. 3, 4, and 5.

FIG. 1C is a block diagram of electrical components included in the base portion 104 of the computing device 100. As shown in FIGS. 1A and 1B, the base portion 104 includes the first multipurpose port 110 and the second multipurpose port 120. Electrical signals are provided to and received from the second multipurpose port 120 by way of interconnections provided by a motherboard 156 included in the base portion 104. Electrical signals are provided to and received from the first multipurpose port 110 by way of a flat cable 158 that connects to the motherboard 156. The determination by the computing device 100 of the electrical signals that are provided and/or received by either or both of the multipurpose ports 110, 120 will be described in more detail with reference to FIGS. 3, 4, and 5.

Figure 2:
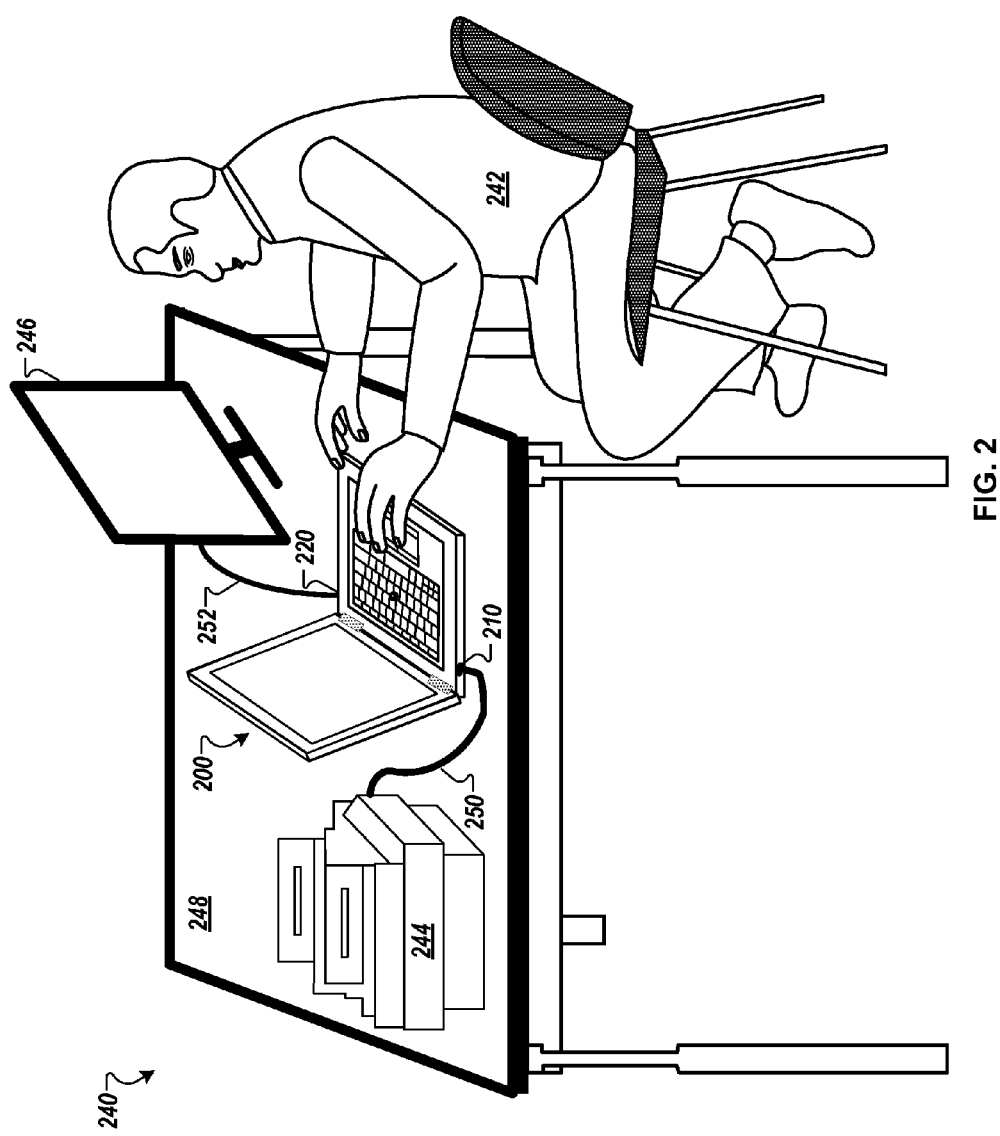
FIG. 2 is a diagram illustrating an example workspace configuration for a user of a computing device.

FIG. 2 is a diagram illustrating an example workspace configuration 240 for a user 242 of a computing device 200. For example, the computing device 200 can be the computing device 100 as shown in FIGS. 1A and 1B. In the example workspace configuration 240, the user 242 arranged a printer 244 and an external display device (monitor) 246 on a tabletop 248 (a desktop) in a desired configuration based, for example, on the size of the tabletop 248, the size of the peripheral devices, and the user preferred location and orientation of the peripheral devices.

The user 242 can connect the printer 244 by way of a first cable 250 into a first multipurpose port 210 that can transmit and receive data for communicating with the printer 244. The user can connect the display device 246 by way of a second cable 252 into a second multipurpose port 220 that can provide display data from the computing device 200 to the display device 246. Alternatively, the user 242 could have connected the printer 244 by way of the first cable 250 into the second multipurpose port 220 and the display device 246 by way of the second cable 252 into the first multipurpose port 210. For example, the second multipurpose port 220 can be the multipurpose port 120 as shown in FIG. 1B, which shows the second side 114 of the example computing device 100.

In some implementations, the printer 244 can include a multipurpose port. The first cable 250 can provide the appropriate connectors on each end of the first cable 250 to connect to, interface with, or plug into the multipurpose port included in the printer 244 and to connect to, interface with, or plug into the first multipurpose port 210 (or the second multipurpose port 220 depending on the workplace configuration) on the computing device 200. For example, the first multipurpose port 210 can incorporate a USB Type-C connector and the multipurpose port included in the printer 244 can incorporate a USB Type-C connector.

In some implementations, the printer 244 may not include a multipurpose port. In these implementations, the first cable 250 can provide the appropriate connector at one end of the first cable 250 that can connect to, interface with, or plug into the port included in the printer 244. The first cable 250 can provide the appropriate connector at the other end of the cable that can connect to, interface with, or plug into the first multipurpose port 210 (or the second multipurpose port 220 depending on the workplace configuration). For example, the first multipurpose port 210 can incorporate a USB Type-C connector and the port included on the printer 244 may incorporate a USB 2.0 type connector (receptacle) or a USB 3.0 type connector (receptacle). In a non-limiting example, the USB 2.0 type connector (receptacle) or the USB 3.0 type connector (receptacle) can be a standard A receptacle, a standard B receptacle, a Mini-A receptacle, a Mini-B receptacle, a Micro-A receptacle, or a Micro-B receptacle. In another example, the port included on the printer 244 may incorporate a proprietary connector. The wiring included in the first cable 250 can ensure the correct connection of the signal at the USB receptacle on the computing device 200 (e.g., the USB Type-C connector) to the corresponding signal at the USB receptacle on the printer 244.

In some implementations, the display device 246 can include a multipurpose port. The second cable 252 can provide the appropriate connectors on each end of the second cable 252 to connect to, interface with, or plug into the multipurpose port included in the display device 246 and to connect to, interface with, or plug into the first multipurpose port 210 (or the second multipurpose port 220 depending on the workplace configuration) on the computing device 200. For example, the first multipurpose port 210 can incorporate a USB Type-C connector and the multipurpose port included in the display device 246 can incorporate a USB Type-C connector.

In some implementations, the display device 246 may not include a multipurpose port. In these implementations, the second cable 252 can provide the appropriate connector at one end of the second cable 252 that can connect to, interface with, or plug into the port included in the display device 246. The second cable 252 can provide the appropriate connector at the other end of the cable that can connect to, interface with, or plug into the first multipurpose port 210 (or the second multipurpose port 220 depending on the workplace configuration) on the computing device 200. In a first example, the first multipurpose port 210 can incorporate a USB Type-C connector and the port included on the display device 246 may incorporate a DisplayPort connector or receptacle (e.g., a Standard DisplayPort connector, a mini DisplayPort connector). In a second example, the first multipurpose port 210 can incorporate a USB Type-C connector and the port included on the display device 246 may incorporate a High-Definition Multimedia Interface (HDMI) connector or receptacle, a Digital Video Interface (DVI) connector or receptacle, or a Video Graphics Array (VGA) connector or receptacle. In another example, the port included on the display device 246 may incorporate a proprietary connector.

The wiring included in the second cable 252 can ensure the correct connection of signals at the USB receptacle on the computing device 200 (e.g., the USB Type-C connector) to corresponding signals at the connector or receptacle on the display device 246 (e.g., the Standard DisplayPort connector, the mini DisplayPort connector, the HDMI connector, the DVI connector, the VGA connector). In the case of the second example, the second cable 252 may also include a converter to convert the USB Type-C DisplayPort compatible signals to the signals needed for the respective connector or receptacle on the display device 246 (e.g., the Standard DisplayPort connector, the mini DisplayPort connector, the HDMI connector, the DVI connector, or the VGA connector).

For example, the first multipurpose port 210 can incorporate a USB Type-C connector and the port included on the display device 246 may incorporate a High-Definition Multimedia Interface (HDMI) connector or receptacle. In addition, the computing device 200 and the display device may be Mobile High-Definition Link (MHL) MHL-enabled devices. The use of the appropriate cable can connect the MHL-enabled computing device to the MHL-enabled display device. In some cases, the cable may include an adapter that can connect the MHL-enabled computing device to the MHL-enabled display device along with allowing power to be provided to the MHL-enabled computing device. Though described using a USB Type-C connector at one end of a cable and a HDMI connector at another end of the cable, any cable that can connect to/interface with connectors/receptacles included on a computing device and a display device and that can provide the appropriate signals for a MHL between the computing device and the display can be used to connect the computing device to the display device. In some cases, the use of a USB Type-C connector at one end of a cable and a HDMI connector at another end of the cable may be needed for higher-speed, higher-resolution MHL interfaces.

Figure 3:
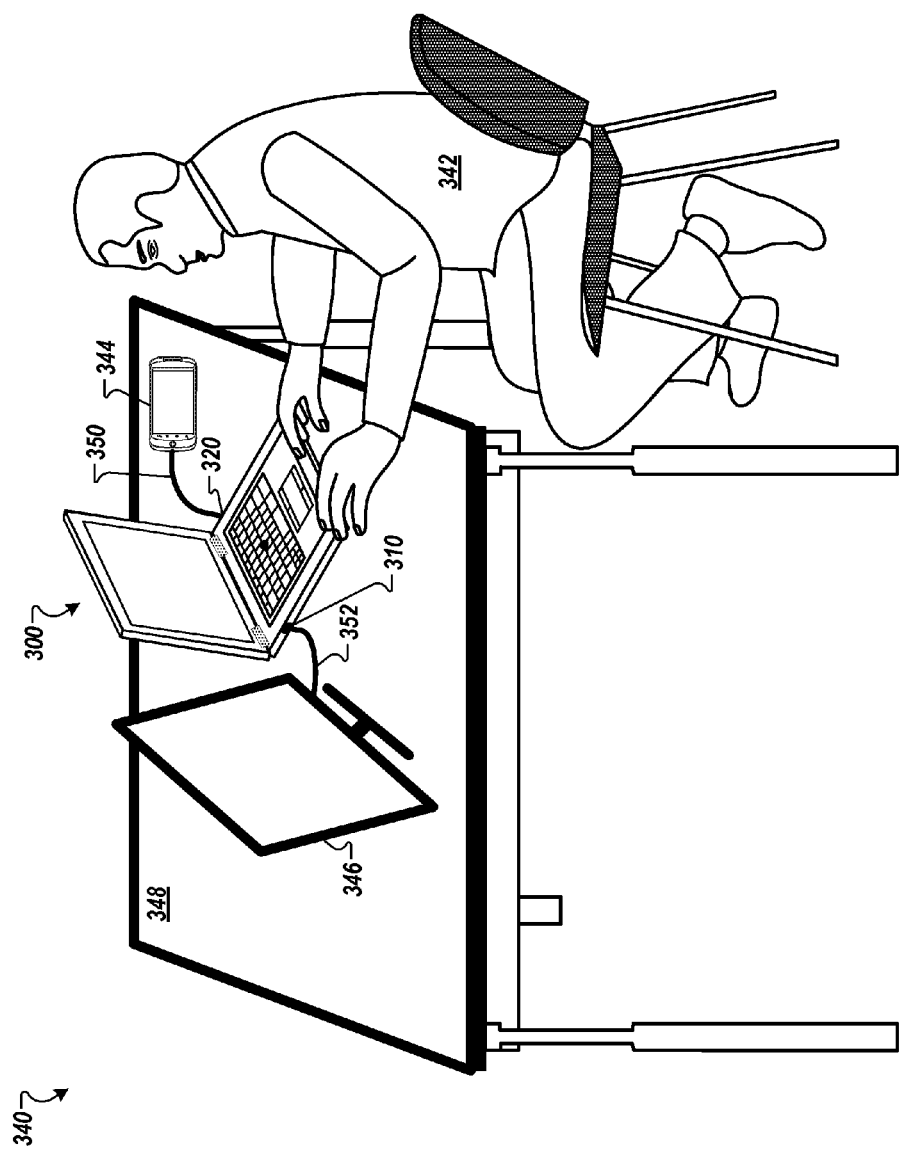
FIG. 3 is a diagram illustrating a first alternate example workspace configuration for a user of a computing device.

FIG. 3 is a diagram illustrating an alternate example workspace configuration 340 for a user 342 of a computing device 300. For example, the computing device 300 can be the computing device 100 as shown in FIGS. 1A and 1B. In the example workspace configuration 340, the user 342 arranged an external display device (monitor) 346 and a mobile computing device 344 on a tabletop 348 (a desktop) in a desired configuration based, for example, on the size of the tabletop 348, the size of the peripheral devices, and the user preferred location and orientation of the peripheral devices.

The user 342 can connect the mobile computing device 344 by way of a first cable 350 into a second multipurpose port 320. In some implementations, the second multipurpose port 320 can supply power to the mobile computing device 344. The mobile computing device 344 can use the supplied power to operate the mobile computing device 344 and/or to charge a battery included in the mobile computing device 344. In some implementations, data can be transferred between the computing device 300 and the mobile computing device 344 by way of the connection of the computing device 300 to the mobile computing device 344. For example, the second multipurpose port 320 can be the multipurpose port 120 as shown in FIG. 1B, which shows the second side 114 of the example computing device 100.

In a non-limiting example, the mobile computing device 344 can be a mobile phone, a personal digital assistant (PDA), a tablet computer, a notebook computer, or a laptop computer. In some implementations, the mobile computing device 344 can include a multipurpose port. The first cable 350 can provide the appropriate connectors on each end of the first cable 350 to connect to, interface with, or plug into the multipurpose port included in the mobile computing device 344 and to connect to, interface with, or plug into the second multipurpose port 320 (or the first multipurpose port 310 depending on the workplace configuration) on the computing device 300. For example, the second multipurpose port 320 can incorporate a USB Type-C connector and the multipurpose port included in the mobile computing device 344 can incorporate a USB Type-C connector.

In some implementations, the mobile computing device 344 may not include a multipurpose port. In these implementations, the first cable 350 can provide the appropriate connector at one end of the first cable 350 that can connect to, interface with, or plug into the port included in the mobile computing device 344. The first cable 350 can provide the appropriate connector at the other end of the cable that can connect to, interface with, or plug into the second multipurpose port 320 (or the first multipurpose port 310 depending on the workplace configuration). For example, the second multipurpose port 320 can incorporate a USB Type-C connector and the port included on the mobile computing device 344 may incorporate a USB 2.0 type connector (receptacle) or a USB 3.0 type connector (receptacle). In a non-limiting example, the USB 2.0 type connector (receptacle) or the USB 3.0 type connector (receptacle) can be a standard A receptacle, a standard B receptacle, a Mini-A receptacle, a Mini-B receptacle, a Micro-A receptacle, or a Micro-B receptacle. In another example, the port included on the mobile computing device 344 may incorporate a proprietary connector. The wiring included in the first cable 350 can ensure the correct connection of the signal at the USB receptacle on the computing device 300 (e.g., the USB Type-C connector) to the corresponding signal at the USB receptacle on the mobile computing device 344.

The user 342 can connect the display device 346 by way of a second cable 352 into a first multipurpose port 310 that can provide display data from the computing device 300 to the display device 346. Alternatively, the user 342 could have connected the mobile computing device 344 by way of the first cable 350 into the first multipurpose port 310 and the user 342 could have connected the display device 346 by way of the second cable 352 into the second multipurpose port 320.

In some implementations, the display device 346 can include a multipurpose port. The second cable 352 can provide the appropriate connectors on each end of the second cable 352 to connect to, interface with, or plug into the multipurpose port included in the display device 346 and to connect to, interface with, or plug into the first multipurpose port 310 (or the second multipurpose port 320 depending on the workplace configuration) on the computing device 300. For example, the first multipurpose port 310 can incorporate a USB Type-C connector and the multipurpose port included in the display device 346 can incorporate a USB Type-C connector.

In some implementations, the display device 346 may not include a multipurpose port. In these implementations, the second cable 352 can provide the appropriate connector at one end of the second cable 352 that can connect to, interface with, or plug into the port included in the display device 346. The second cable 352 can provide the appropriate connector at the other end of the cable that can connect to, interface with, or plug into the first multipurpose port 310 (or the second multipurpose port 320 depending on the workplace configuration) on the computing device 300. In a first example, the first multipurpose port 310 can incorporate a USB Type-C connector and the port included on the display device 346 may incorporate a DisplayPort connector or receptacle (e.g., a Standard DisplayPort connector, a mini DisplayPort connector). In a second example, the first multipurpose port 310 can incorporate a USB Type-C connector and the port included on the display device 346 may incorporate a High-Definition Multimedia Interface (HDMI) connector or receptacle, a Digital Video Interface (DVI) connector or receptacle, or a Video Graphics Array (VGA) connector or receptacle. In another example, the port included on the display device 346 may incorporate a proprietary connector.

The wiring included in the second cable 352 can ensure the correct connection of the signals at the USB receptacle on the computing device 300 (e.g., the USB Type-C connector) to the corresponding signals at the connector or receptacle on the display device 346 (e.g., the Standard DisplayPort connector, the mini DisplayPort connector, the HDMI connector, the DVI connector, the VGA connector). In the case of the second example, the second cable 352 may also include a converter to convert USB Type-C DisplayPort compatible signals to signals needed for the respective connector or receptacle on the display device 346 (e.g., the Standard DisplayPort connector, the mini DisplayPort connector, the HDMI connector, the DVI connector, or the VGA connector).

Figure 4:
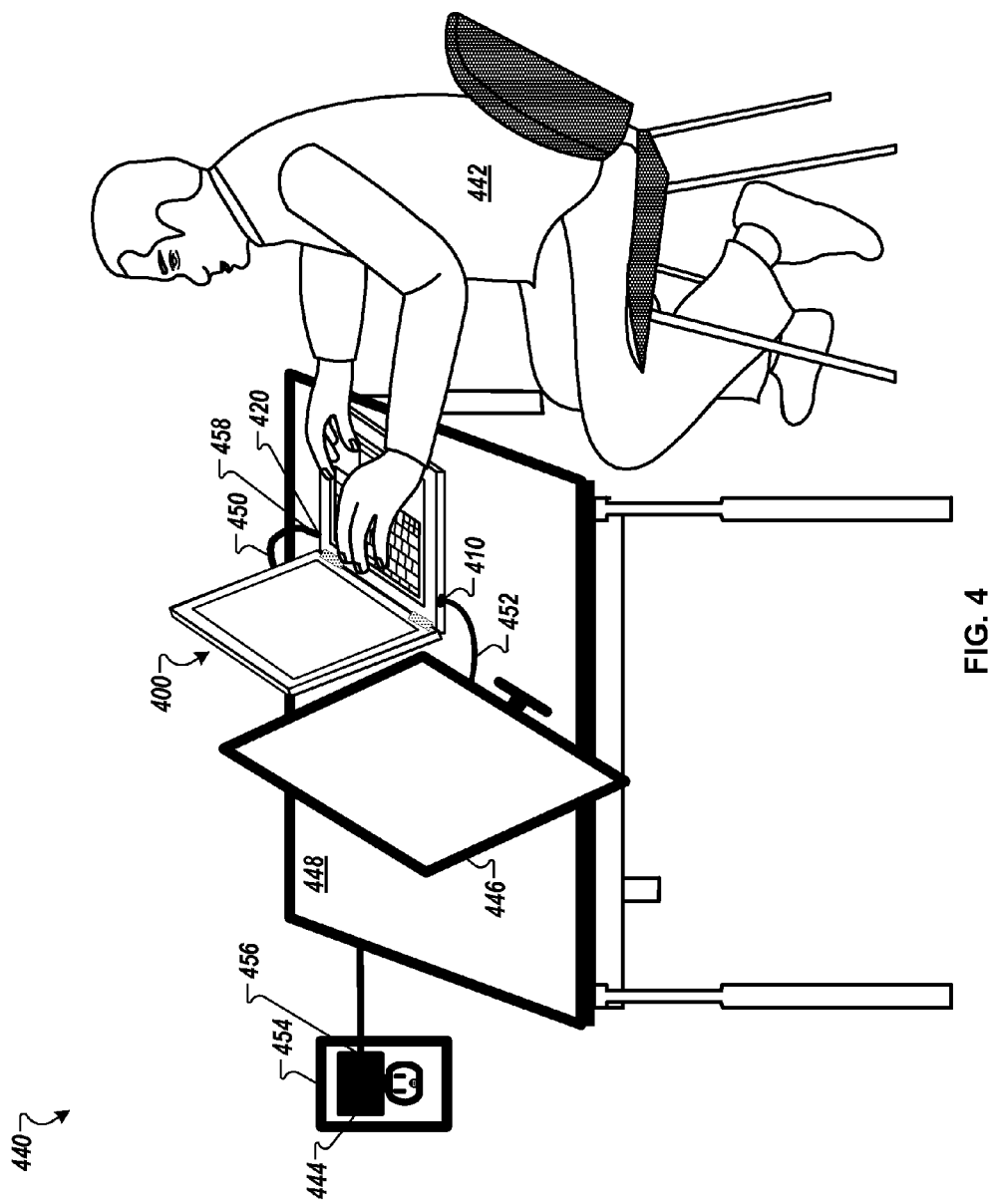
FIG. 4 is a diagram illustrating a second alternate example workspace configuration for a user of a computing device.

FIG. 4 is a diagram illustrating an alternate example workspace configuration 440 for a user 442 of a computing device 400. For example, the computing device 400 can be the computing device 100 as shown in FIGS. 1A and 1B. In the example workspace configuration 440, the user 442 arranged an external display device (monitor) 446 on a tabletop 448 (a desktop) in a desired configuration based, for example, on the size of the tabletop 448, the size of the peripheral devices, and the user preferred location and orientation of the peripheral devices.

The user 442 can connect the display device 446 by way of a second cable 352 into a first multipurpose port 410 that can provide display data from the computing device 400 to the display device 446. Alternatively, the user 442 could have connected the display device 446 by way of the second cable 452 into the second multipurpose port 420. For example, the second multipurpose port 420 can be the multipurpose port 120 as shown in FIG. 1B, which shows the second side 114 of the example computing device 100.

In some implementations, the display device 446 can include a multipurpose port. The second cable 452 can provide the appropriate connectors on each end of the second cable 452 to connect to, interface with, or plug into the multipurpose port included in the display device 446 and to connect to, interface with, or plug into the first multipurpose port 410 (or the second multipurpose port 420 depending on the workplace configuration) on the computing device 400. For example, the first multipurpose port 410 can incorporate a USB Type-C connector and the multipurpose port included in the display device 446 can incorporate a USB Type-C connector.

In some implementations, the display device 446 may not include a multipurpose port. In these implementations, the second cable 452 can provide the appropriate connector at one end of the second cable 452 that can connect to, interface with, or plug into the port included in the display device 446. This can be done as described with reference to FIGS. 3 and 4.

The user 442 can connect a power adapter 444 by way of a first cable 450 into a first multipurpose port 410. The power adapter 444 can be plugged into an outlet 454 (e.g., a wall outlet) that can provide AC power to the power adapter 444. The power adapter 444 can convert the AC power to the appropriate DC power for powering and/or charging a battery included in the computing device 400. Alternatively, the user 442 could have connected the display device 446 by way of the second cable 452 into the second multipurpose port 420 and the power adapter 444 by way of the first cable 450 into the first multipurpose port 410.

In some implementations, the power adapter 444 may be integrated with/part of a first end 456 of the first cable 450. The first cable 450 can include an appropriate connector at a second end 458 of the first cable 450 that can connect to, interface with, or plug into the second multipurpose port 420 (or the first multipurpose port 410 depending on the workplace configuration) on the computing device 400. The wiring included in the first cable 450 can ensure the correct connection of signals at the connector (receptacle) incorporated into the second multipurpose port 420 on the computing device 400 (e.g., a USB Type-C connector) to the corresponding signals at the power adapter 444.

In some implementations, the power adapter 444 can include a port that incorporates a connector or receptacle that accepts a plug on the first end 456 of the first cable 450. For example, the second multipurpose port 420 can incorporate a USB Type-C connector and the port included in the power adapter 444 can incorporate a USB Type-C connector. In another example, the second multipurpose port 420 can incorporate a USB Type-C connector and the port included in the power adapter 444 can incorporate a USB standard A-type receptacle (e.g., USB 2.0 or USB 3.0). The wiring included in the first cable 450 can ensure the correct connection of signals at the connector (receptacle) incorporated into the second multipurpose port 420 on the computing device 400 (e.g., a USB Type-C connector) to the corresponding signals at the USB receptacle in the power adapter 444.

Figure 5A:
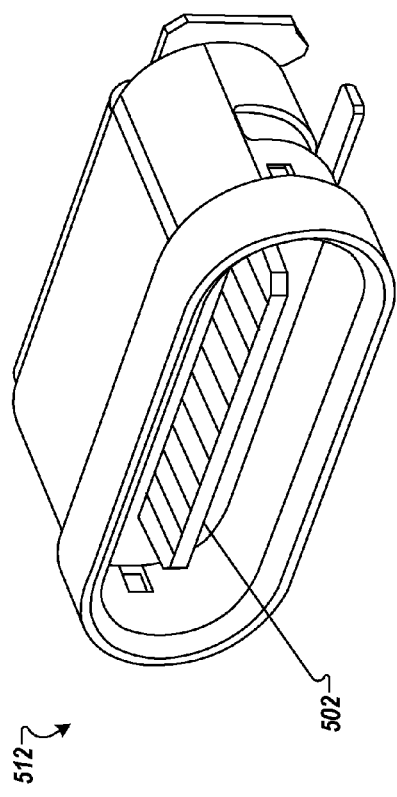
FIG. 5A is a diagram that illustrates an example connector (receptacle) incorporated in a multi-purpose port included in a computing device.

FIG. 5A is a diagram that illustrates an example connector (receptacle) 512 incorporated in a multipurpose port included in a computing device. For example, referring to FIGS. 1A, 1B, 1C, 2, 3, and 4, the connector (receptacle) 512 can be the connector 112 as shown in FIGS. 1A-C. The connector (receptacle) 512 can be incorporated into the multipurpose ports (the first multipurpose port 210, the second multipurpose port 220, the first multipurpose port 310, the second multipurpose port 320, the first multipurpose port 410, and the second multipurpose port 420) in the example implementation of the computing device 200, the computing device 300, and the computing device 400, as shown in FIGS. 2, 3, and 4, respectively. The connector (receptacle) 512 includes electrical contacts 502.

Figure 5B:
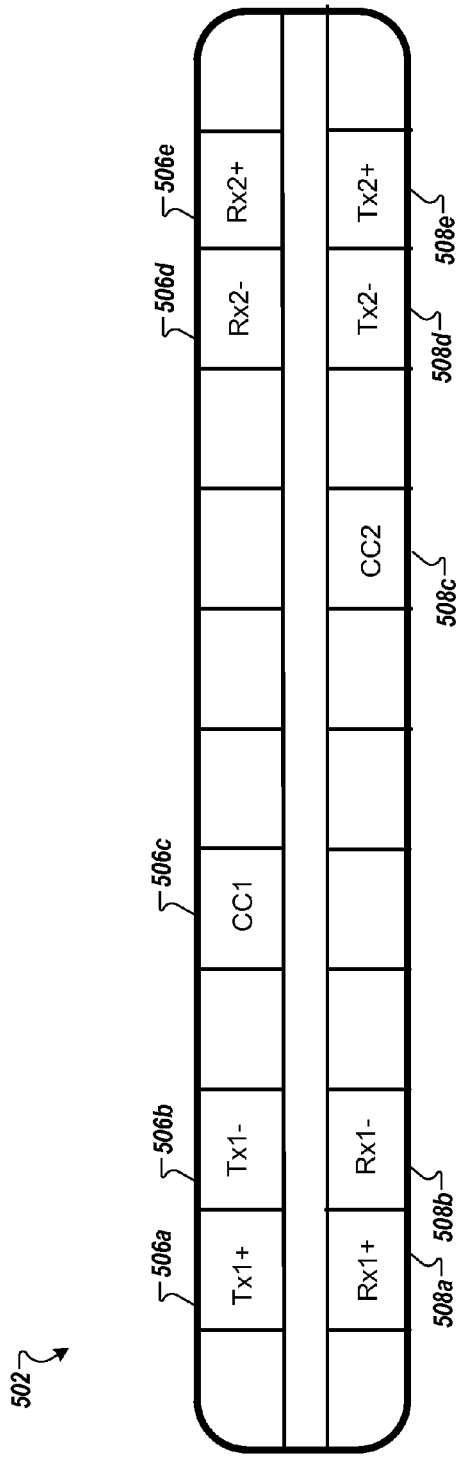
FIG. 5B is a diagram that illustrates example signals and example signals included on the electrical contacts of the example connector (receptacle).

FIG. 5B is a diagram that illustrates example signals 506a-e and example signals 508a-d included on the electrical contacts 502 of the example connector (receptacle) 512.

Figure 6A:
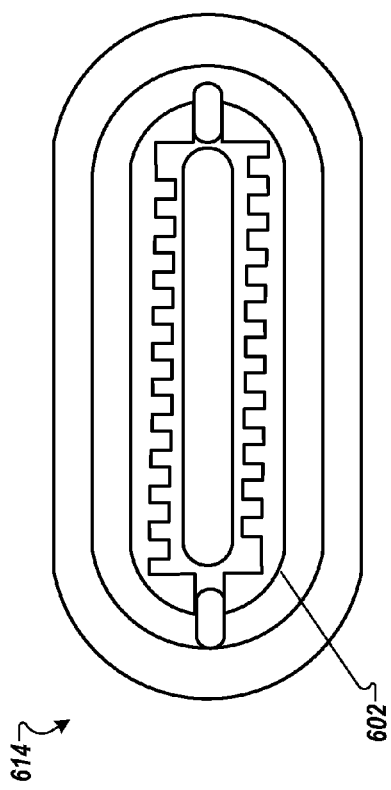
FIG. 6A is a diagram that illustrates an example connector (plug) that can be included on an end of a cable that can connect to/interface with/plug into the connector (receptacle) as shown in FIG. 5A.

FIG. 6A is a diagram that illustrates an example connector (plug) 614 that can be included on an end of a cable that can connect to/interface with/plug into the connector (receptacle) 512 as shown in FIG. 5A. In addition or in the alternative, the connector (plug) 614 can be connected to/interfaced with/plugged into a connector (receptacle) included on a peripheral device (e.g., any of the peripheral devices discussed herein with reference to FIGS. 2, 3, and 4). In some implementations, a connector (plug) on each end of a cable can be of the same type (e.g., both are connectors (plugs) of the type of connector (plug) 614). In some implementations, one end of a cable can include the connector (plug) 614 and the other end of the cable can be a different type of connector (plug), as discussed herein with reference to FIGS. 2, 3, and 4. The connector (plug) 614 includes electrical contacts 602.

Figure 6B:
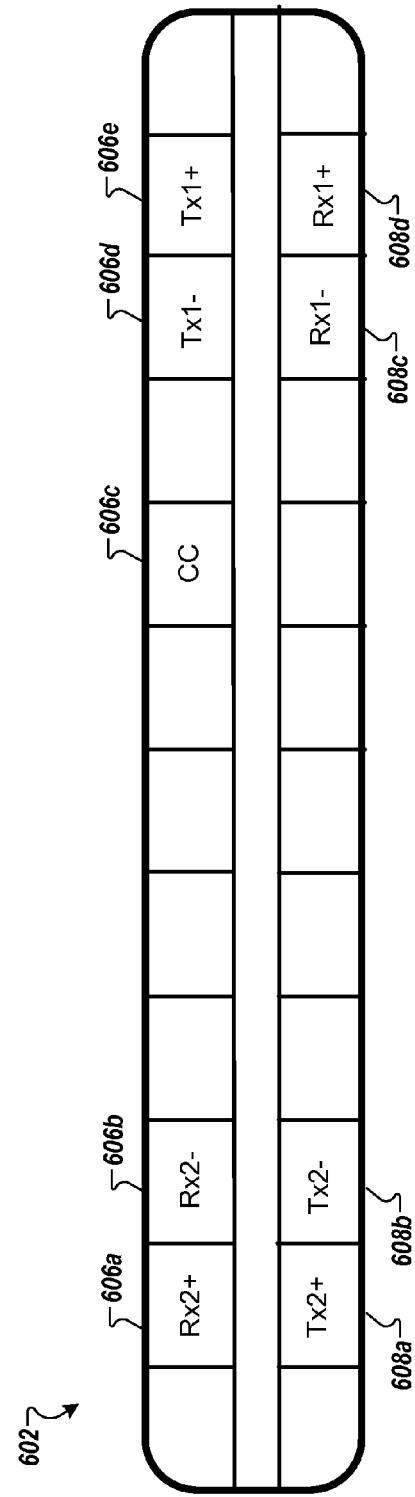
FIG. 6B is a diagram that illustrates example signals and example signals included on the electrical contacts of the example connector (plug).

FIG. 6B is a diagram that illustrates example signals 606a-e and example signals 608a-d included on the electrical contacts 602 of the example connector (plug) 614.

In the example diagrams shown in FIGS. 5A-B and FIGS. 6A-B, the connector (plug) 614 can connect to/interface with/plug into the connector (receptacle) 512 in a first orientation and a reverse of the first orientation. In a first orientation, the signals 506a-c on the connector (receptacle) 512 can be connected to the signals 606c-a on the connector (plug) 614, respectively. In addition, the signals 508a, 508b, 508d, and 508e can be connected to the signals 608d, 608c, 608b, and 608a, respectively. In a second orientation, the connector (plug) 614 can be inserted into the connector (receptacle) 512 in a direction that is reversed (e.g., flipped, rotated 180 degrees) from the first orientation. In the second orientation, the signals 506a, 506b, 506d, and 506e on the connector (receptacle) 512 can be connected to the signals 608a, 608b, 608c, and 608d on the connector (plug) 614, respectively. In addition, the signals 508a-e can be connected to the signals 606a-e, respectively. The connecting of the signal 506c on the connector (receptacle) 512 to the signal 606c on the connector (plug) 614 indicates that the connector (plug) 614 is inserted into the connector (receptacle) 512 in the first orientation. The connecting of the signal 508c on the connector (receptacle) 512 to the signal 606c on the connector (plug) 614 indicates that the connector (plug) 614 is inserted into the connector (receptacle) 512 in the second orientation.

The electrical contacts 602 can be coupled to/connected to respective electrical wires included in a cable. The electrical wires can then be coupled to/connected to electrical contacts included in another connector (plug) at the other end of the cable. As described with respect to FIGS. 2, 3, and 4, in some implementations, the connector (plug) at either end of a cable can be the same type of the connector (plug). In some implementations, the connector (plug) at one end of a cable can be different that the type of the connector (plug) at the other end of the cable. The electrical wires in the cable connect the signals on the electrical contacts on one end of the cable to the appropriate, respective signals on the electrical contacts on the other end of the cable.

Figure 7:
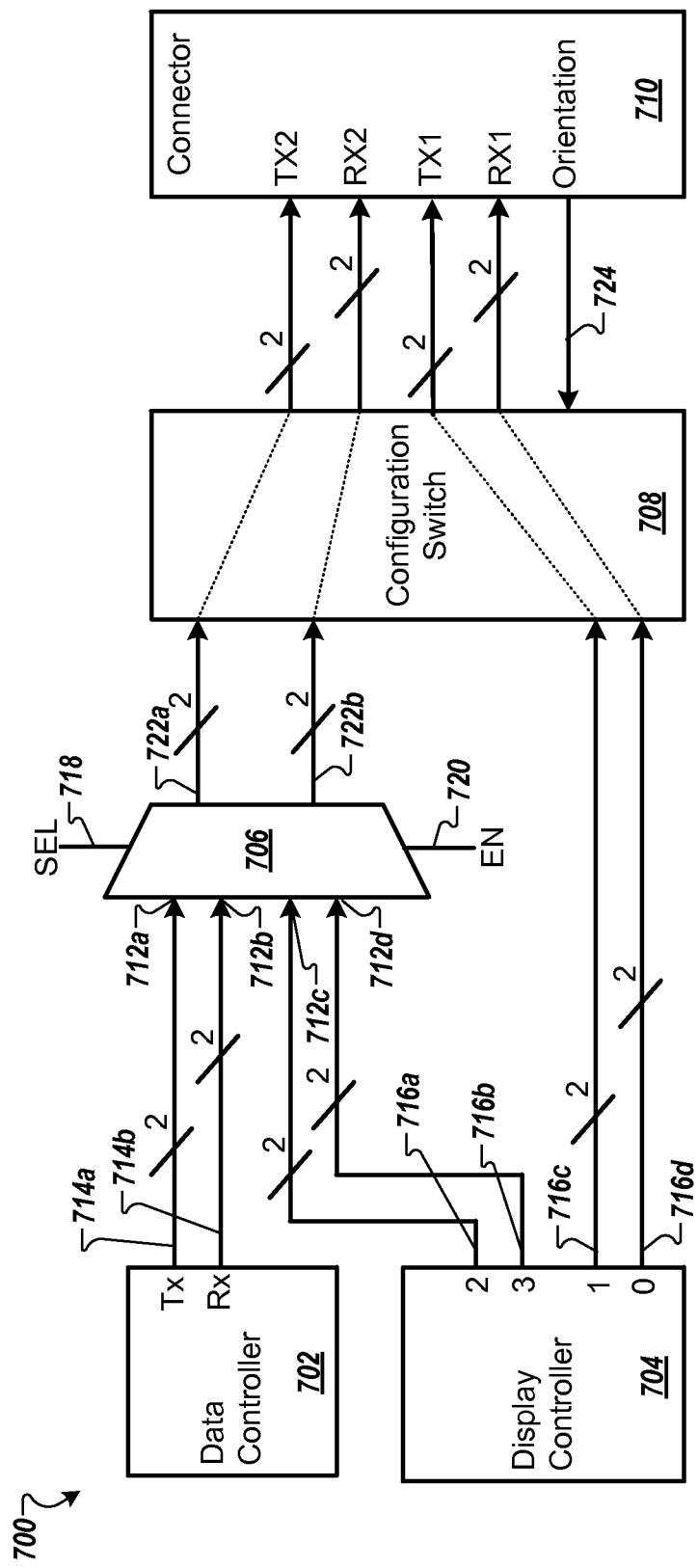
FIG. 7 is a block diagram showing example electrical circuitry that includes a data controller, a display controller, a multiplexer, a configuration switch, and a connector (receptacle).

FIG. 7 is a block diagram showing example electrical circuitry 700 that includes a data controller 702, a display controller 704, a multiplexer 706, a configuration switch 708, and a connector (receptacle) 710. For example, the electrical circuitry 700 can be included in/be part of the motherboard 156 included in the base portion 104 of the computing device 100, as shown with reference to FIGS. 1A-C. The connector (receptacle) 710 can be connector 112 as shown with reference to FIGS. 1A-B or the connector (receptacle) 512 as shown in FIG. 5A.

As shown in FIG. 7, the multiplexer 706 can receive differential pair data output signals 714a-b from the data controller 702 as differential pair input signals 712a-b. A differential pair signaling system can transmit/provide a signal on a pair of tightly coupled wires. One wire carries the signal and the other wire carries an equal but opposite image of the signal. The use of differential pair signals can cancel out and essentially eliminate common mode electrical noise and can reduce noise from external sources or neighboring signals. This can increase the integrity of the signals especially when carrying data at a high-speed data rate (e.g., five Gigabits per second, ten Gigabits per second).

The multiplexer 706 can receive differential pair display output signals 716a-b from the display controller 704 as differential pair input signals 712c-d. A select input 718 and an enable input 720 could determine if differential pair multiplexer output signals 722a-b are the differential pair data output signals 714a-b or the differential pair display output signals 716a-b. The configuration switch 708 receives the multiplexer output signals 722a-b and differential pair display output signals 716c-d from the display controller 704. In addition, the configuration switch 708 can receive an orientation signal 724 from the connector (receptacle) 710. The configuration switch 708 can detect the orientation of a connector (plug) when inserted into the connector (receptacle) using the orientation signal 724.

The configuration switch 708 can route the multiplexer output signals 722a-b and the differential pair display output signals 716c-d to the appropriate pins/contacts on the connector (receptacle) 710 based on the detected orientation (the orientation signal 724). Referring to FIGS. 5A-B and 6A-B, the orientation of a connector (plug) when inserted into the connector (receptacle) can determine the routing of the multiplexer output signals 722a-b and differential pair display output signals 716c-d to the connector (receptacle) 710. Though shown as a single orientation signal 724, in some implementations, an orientation signal can include more than one input signal to the configuration switch 708.

In a non-limiting example, the data controller 702 can be a USB controller. The differential pair data output signals 714a-b can be a differential pair transmit signal and a differential pair receive signal, respectively, for use in high-speed USB communications (e.g., USB 3.0, USB 3.1). The display controller 704 can be a DisplayPort Source that can provide four high-speed lanes (e.g., the differential pair display output signals 716a-d) that can deliver full DisplayPort performance. The connector (receptacle) 710 can be a USB Type-C connector (receptacle).

In some implementations, the multiplexer 706 can select to output transmit and receive signals (e.g., the differential pair data output signals 714a-b) as received from the data controller 702 (the USB controller) to the configuration switch 708. In addition, the configuration switch 708 can receive directly from the display controller 704 (the DisplayPort Source) output high-speed lane 1 and high-speed lane 0 (e.g., the differential pair display output signals 716c-d). Depending on the determined orientation of a connector (plug) inserted into the connector (receptacle) 710, the configuration switch 708 can determine the routing of the differential pair display output signals 716a-b and the routing of the differential pair data output signals 714a-b to the connector (receptacle) 710.

In these implementations, a computing device (e.g., the computing device 100) can provide DisplayPort performance and high-speed USB performance. In these implementations, the computing device can be interfaced to/connected to a docking station that can allow the simultaneous transfer of high-speed USB data on the differential pair data output signals 714a-b and display data on the differential pair display output signals 716c-d to a peripheral device and a display device, respectively.

In some implementations, the multiplexer 706 can select to output high-speed lane 2 and high-speed lane 3 (e.g., the differential pair display output signals 716a-b) as received from the display controller 704 (the DisplayPort Source) to the configuration switch 708. In addition, the configuration switch 708 can receive directly from the display controller 704 (the DisplayPort Source) output high-speed lane 1 and high-speed lane 0 (e.g., the differential pair display output signals 716c-d). Depending on the determined orientation of a connector (plug) inserted into the connector (receptacle) 710, the configuration switch 708 can determine the routing of the differential pair display output signals 716a-d to the connector (receptacle) 710.

In these implementations, a computing device (e.g., the computing device 100) can provide full DisplayPort performance utilizing an optional DisplayPort Alternate Mode capability of a USB Type-C connector. As described with reference to FIGS. 2, 3, and 4, for example, a connector (plug) on both ends of a cable can be a USB Type-C connector (plug). In this example, one end of the cable can plug into a USB Type-C connector (receptacle) included in a port of the computing device (e.g., the connector (receptacle) 710) and the other end of the cable can plug into a USB Type-C connector (receptacle) included in a display device.

In another example, a display device may include a DisplayPort connector (receptacle) (e.g., a Standard DisplayPort connector, a mini DisplayPort connector). In this example, a connector (plug) on one end of a cable can be a USB Type-C connector (plug) that plugs into a USB Type-C connector (receptacle) included in a port of the computing device (e.g., the connector (receptacle) 710). The other end of the cable can be a DisplayPort connector (plug) (e.g., a Standard DisplayPort connector, a mini DisplayPort connector) that plugs into a DisplayPort connector (receptacle). In another example, a display device may include an HDMI, DVI, or VGA connector (receptacle). In this example, the configuration switch 708 may include a converter that converts the differential pair display output signals 716a-d into the signals needed for connection to an HDMI, DVI, or VGA connector (receptacle) included on the display device. In some cases, the converter may be an adapter separate from the configuration switch 708.

When providing the differential pair display output signals 716a-d to the connector (receptacle) 710, the differential pair display output signals 716a-b are routed through the multiplexer 706 while the differential pair display output signals 716c-d are not. The routing of the differential pair display output signals 716a-b through the multiplexer 706 can introduce signal propagation delays to the differential pair display output signals 716a-b that are not present in the differential pair display output signals 716c-d. This mismatching can affect the quality of the display data.

Figure 8:
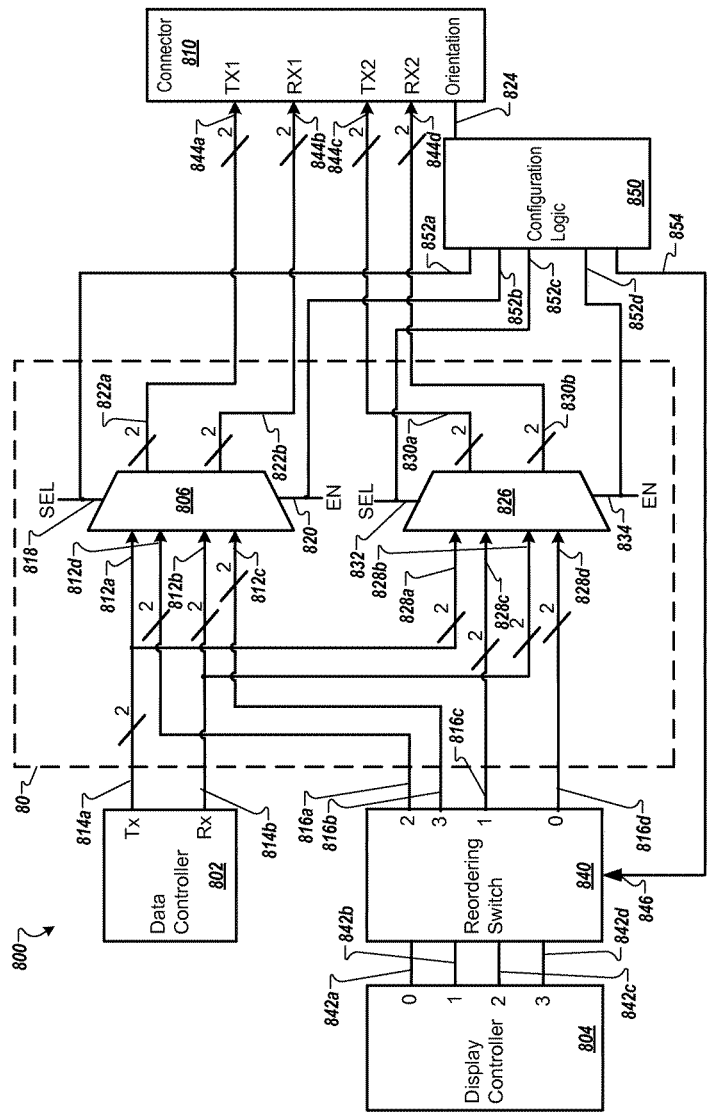
FIG. 8 is a block diagram showing example electrical circuitry that includes a data controller, a display controller, a first multiplexer, a second multiplexer, a configuration switch, and a connector (receptacle).

FIG. 8 is a block diagram showing example electrical circuitry 800 that includes a data controller 802, a display controller 804, a reordering switch 840, a first multiplexer 806, a second multiplexer 826, configuration logic 850, and a connector (receptacle) 810. For example, the electrical circuitry 800 can be included in/be part of the motherboard 156 included in the base portion 104 of the computing device 100, as shown with reference to FIGS. 1A-C. The connector (receptacle) 810 can be connector 112 as shown with reference to FIGS. 1A-B or the connector (receptacle) 512 as shown in FIG. 5A.

As shown in FIG. 8, the first multiplexer 806 can receive differential pair data output signals 814a-b from the data controller 802 as differential pair input signals 812a-b. The first multiplexer 806 can receive differential pair display output signals 816a-b from the reordering switch 840 as differential pair input signals 812c-d. A select input 818 and an enable input 820 could determine if differential pair multiplexer output signals 822a-b are the differential pair data output signals 814a-b or the differential pair display output signals 816a-b. The connector (receptacle) 810 can receive the multiplexer output signals 822a-b.

The second multiplexer 826 can receive differential pair data output signals 814a-b from the data controller 802 as differential pair input signals 828a-b. The second multiplexer 826 can receive differential pair display output signals 816c-d from the reordering switch 840 as differential pair input signals 828c-d. A select input 832 and an enable input 834 could determine if differential pair multiplexer output signals 830a-b are the differential pair data output signals 814a-b or the differential pair display output signals 816c-d. The connector (receptacle) 810 can receive the multiplexer output signals 830a-b. The configuration logic 850 can receive an orientation signal 824 from the connector (receptacle) 810. The configuration logic 850 can determine the orientation of a connector (plug) when inserted into the connector (receptacle) 810 based on a value of the orientation signal 824. The configuration logic 850 can provide a configuration control signal 852a-d to the select input 818, the enable input 820, the select input 832, and the enable input 834, respectively, based on the determined orientation of a connector (plug) when inserted into the connector (receptacle) 810.

In addition, the configuration logic 850 can provide a reorder configuration control signal 854 to a reorder control input 846 of the reordering switch 840. Based on the determined orientation of a connector (plug) when inserted into the connector (receptacle) 810 (and the value of the reorder control signal 846), the reordering switch 840 can reorder/switch differential pair display controller output signals 842a-d received from the display controller 804. The reordering/switching of the differential pair display controller output signals 842a-d can ensure that the appropriate signals are routed to the appropriate pins/contacts on the connector (receptacle) 810 based on the detected orientation of a connector (plug) when inserted into the connector (receptacle) 810 (based on the value of the orientation signal 824). In some implementations, the reordering switch 840 can be included as part of the display controller 804.

Referring to FIGS. 5A-B and 6A-B, the orientation of a connector (plug) when inserted into the connector (receptacle) can determine the routing of the display controller output signals 842a-d to the connector 810. Though shown as a single orientation signal 824, in some implementations, an orientation signal can include more than one input signal to the configuration logic 850.

In the example circuitry shown in FIG. 8, the differential pair data output signals 814a-b are routed to the first multiplexer 806 and the second multiplexer 826. Routing the differential pair data output signals 814a-b to both the first multiplexer 806 and the second multiplexer 826 can introduce signal integrity issues due to the length of the signal traces when routing the differential pair data output signals 814a-b to both the multiplexers 806, 826. Placement of the first multiplexer 806 and the second multiplexer 826 close to one another can reduce the signal integrity issues but may not eliminate the issues.

In the example circuitry shown in FIG. 8, the differential pair display output signals 816a-b are routed through the first multiplexer 806 and the differential pair display output signals 816c-d are routed through the second multiplexer 826. The routing of the differential pair display output signals 816a-d through multiplexers introduces substantially the same signal propagation delays on the differential pair display output signals 816a-b and the differential pair display output signals 816c-d.

In a non-limiting example, the data controller 802 can be a USB controller. The differential pair data output signals 814a-b can be a differential pair transmit signal and a differential pair receive signal, respectively, for use in high-speed USB communications (e.g., USB 3.0, USB 3.1). The display controller 804 can be a DisplayPort Source that can provide four high-speed lanes (e.g., the differential pair display controller output signals 842a-d) that can deliver full DisplayPort performance. The connector (receptacle) 810 can be a USB Type-C connector (receptacle).

In some implementations, the multiplexer 806 can select to output transmit and receive signals (e.g., the differential pair data output signals 814a-b) as received from the data controller 802 (the USB controller) to the connector 810 as differential pair multiplexer output signals 822a-b. In addition, the multiplexer 826 can select to output the differential pair display output signals 816c-d as received from the reordering switch 840 (e.g., the DisplayPort Source output high-speed lane 1 and high-speed lane 0) as differential pair multiplexer output signals 830a-b. Depending on the determined orientation of a connector (plug) inserted into the connector (receptacle) 810, the reordering switch 840 can determine that the differential pair display output signals 816c-d and the differential pair data output signals 814a-b should be routed to connector inputs 844c-d and connector inputs 844a-b, respectively, on the connector (receptacle) 810.

In some implementations, the multiplexer 806 can select to output differential pair display output signals 816a-b from the reordering switch 840 (e.g., the DisplayPort Source output high-speed lane 2 and high-speed lane 3) as differential pair multiplexer output signals 822a-b. In addition, the multiplexer 826 can select to output transmit and receive signals (e.g., the differential pair data output signals 814a-b) as received from the data controller 802 (the USB controller) to the connector (receptacle) 810 as differential pair multiplexer output signals 830a-b. Depending on the determined orientation of a connector (plug) inserted into the connector (receptacle) 810, the reordering switch 840 can determine that the differential pair display output signals 816a-b and the differential pair data output signals 814a-b should be routed to connector inputs 844c-d and connector inputs 844a-b, respectively, on the connector (receptacle) 810.

In these implementations, a computing device (e.g., the computing device 100) can provide DisplayPort performance and high-speed USB performance. In these implementations, the computing device can be interfaced to/connected to a docking station that can allow the simultaneous transfer of high-speed USB data on the differential pair data output signals 814a-b and display data on the differential pair display output signals 816a-b or on the differential pair display output signals 816c-d to a peripheral device and a display device, respectively.

In some implementations, the multiplexer 806 can select to output high-speed lane 2 and high-speed lane 3 (e.g., the differential pair display output signals 816a-b) as received from the reordering switch 840, which receives the signals from the display controller 804 (the DisplayPort Source) to the connector (receptacle) 810. In addition, the multiplexer 826 can select to output the differential pair display output signals 816c-d as received from the reordering switch 840, which receives the signals from the display controller 804

(the DisplayPort Source) to the connector (receptacle) 810 as differential pair multiplexer output signals 830*a-b*. Depending on the determined orientation of a connector (plug) inserted into the connector (receptacle) 810, the reordering switch 840 can determine the routing of the differential pair display controller output signals 842*a-d* to the connector (receptacle) 810.

In these implementations, a computing device (e.g., the computing device 100) can provide full DisplayPort performance utilizing an optional DisplayPort Alternate Mode capability of a USB Type-C connector. As described with reference to FIGS. 2, 3, and 4, for example, a connector (plug) on both ends of a cable can be a USB Type-C connector (plug). In this example, one end of the cable can plug into a USB Type-C connector (receptacle) included in a port of the computing device (e.g., the connector (receptacle) 810) and the other end of the cable can plug into a USB Type-C connector (receptacle) included in a display device.

In another example, a display device may include a DisplayPort connector (receptacle) (e.g., a Standard DisplayPort connector, a mini DisplayPort connector). In this example, a connector (plug) on one end of a cable can be a USB Type-C connector (plug) that plugs into a USB Type-C connector (receptacle) included in a port of the computing device (e.g., the connector (receptacle) 710). The other end of the cable can be a DisplayPort connector (plug) (e.g., a Standard DisplayPort connector, a mini DisplayPort connector) that plugs into a DisplayPort connector (receptacle). In another example, a display device may include an HDMI, DVI, or VGA connector (receptacle). For example, circuitry placed between the differential pair display output signals 816*a-d* and the multiplexer 806 and the multiplexer 826 may include a converter that converts the differential pair display output signals 816*a-d* into the signals needed for connection to an HDMI, DVI, or VGA connector (receptacle) included on the display device. In some cases, a converter may be included in each of the multiplexers 806, 826.

The example electrical circuitry 700 shown in FIG. 7 and the example electrical circuitry 800 shown in FIG. 8 each introduce signal integrity issues that can affect the quality of the display data.

Figure 9:
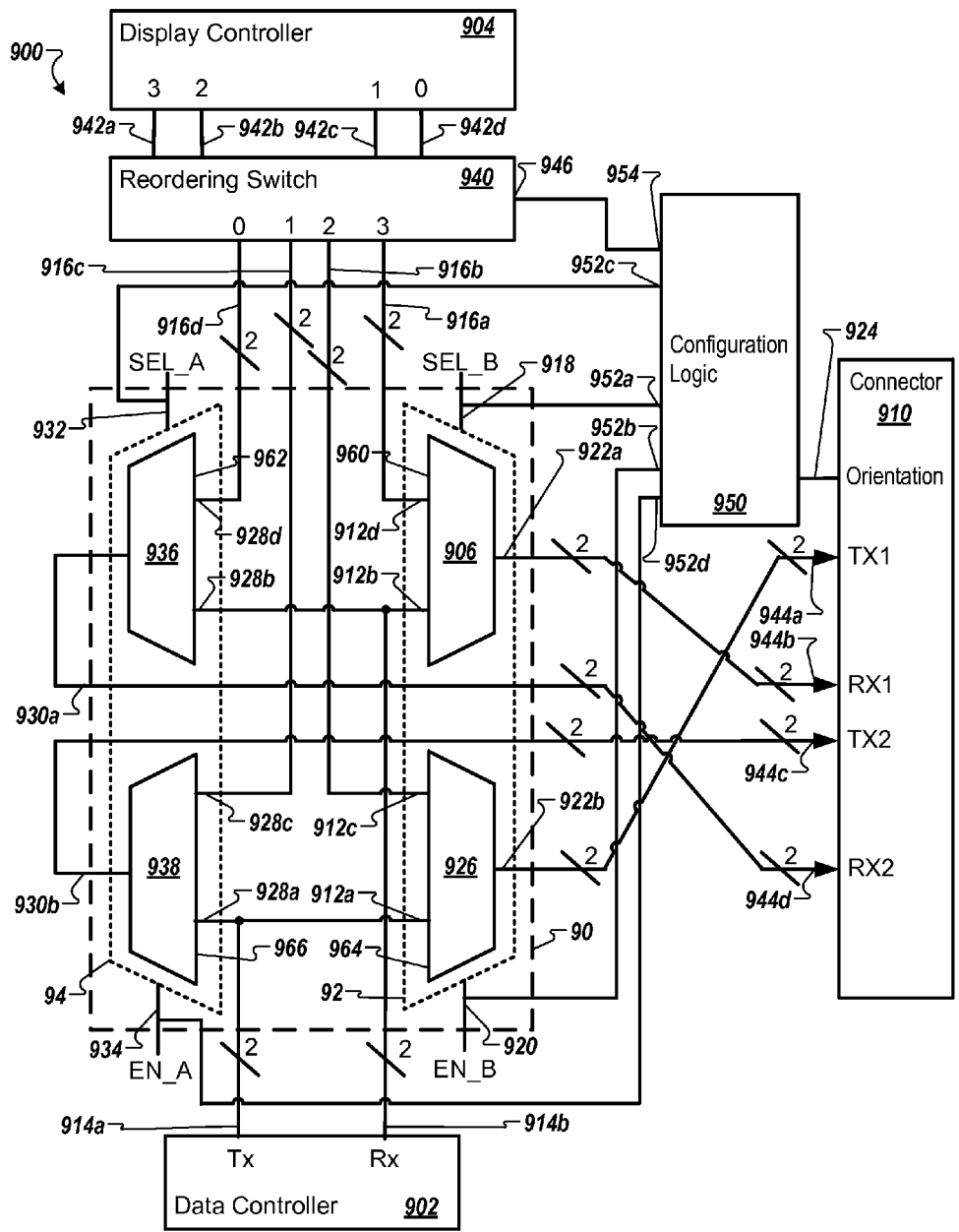
FIG. 9 is a block diagram showing example electrical circuitry that includes a data controller, a display controller, a first multiplexer, a second multiplexer, a third multiplexer, a fourth multiplexer, a configuration switch, and a connector (receptacle).

FIG. 9 is a block diagram showing example electrical circuitry 900 that includes a data controller 902, a display controller 904, a first multiplexer 906, a second multiplexer 926, a third multiplexer 936, a fourth multiplexer 938, a reordering switch 940, configuration logic 950, and a connector (receptacle) 910. For example, the electrical circuitry 900 can be included in/be part of the motherboard 156 included in the base portion 104 of the computing device 100, as shown with reference to FIGS. 1A-C. The connector (receptacle) 910 can be connector 112 as shown with reference to FIGS. 1A-B or the connector (receptacle) 512 as shown in FIG. 5A.

The example electrical circuitry 900 functions in a manner similar to the example electrical circuitry 800 as shown in FIG. 8. As indicated by a dotted line 80 in FIG. 8 and a dotted line 90 in FIG. 9, the electrical circuitry included in the area inside the dotted line 80 can be implemented as shown with the dotted line 90 in FIG. 9. For example, the multiplexer 806 can be implemented using the first multiplexer 906 and the second multiplexer 926 (as shown by a dotted line 92 in FIG. 9). The multiplexer 826 can be implemented using the third multiplexer 936 and the fourth multiplexer 938 (as shown by a dotted line 94 in FIG. 9). Placement of the third multiplexer 936 and the fourth multiplexer 938 stacked one above the other and then in a back-to-back configuration with the first multiplexer 906 and the second multiplexer 926 (stacked one above the other) can allow for placement of the multiplexers 936, 938, 906, and 926 in close proximity to one another. In addition, routing the signals from the data controller 902 and the reordering switch 940 as shown in FIG. 9 (between the back-to-back configuration of the multiplexers 936, 938, 906, and 926) can reduce the length of the signal routing minimizing signal degradation that could be associated with lengthy and mismatched signal path lengths. For example, an input end 960 of the first multiplexer 906 faces an input end 962 of the third multiplexer 936. An input end 964 of the second multiplexer 926 faces an input end 966 of the fourth multiplexer 938.

As shown in FIG. 9, the first multiplexer 906 can receive differential pair data output signal 914*b* from the data controller 902 as differential pair input signal 912*b*. The first multiplexer 906 can receive differential pair display output signal 916*a* from the reordering switch 940 as differential pair input signal 912*d*. The second multiplexer 926 can receive differential pair data output signal 914*a* from the data controller 902 as differential pair input signal 912*a*. The second multiplexer 926 can receive differential pair display output signal 916*b* from the reordering switch 940 as differential pair input signal 912*c*. A select input 918 and an enable input 920 could determine if differential pair multiplexer output signals 922*a-b* are the differential pair data output signals 914*a-b* or the differential pair display output signals 916*a-b*. The connector (receptacle) 910 can receive the multiplexer output signals 922*a-b*.

The third multiplexer 936 can receive differential pair data output signal 914*b* from the data controller 902 as differential pair input signal 928*b*. The third multiplexer 936 can receive differential pair display output signal 916*d* from the reordering switch 940 as differential pair input signal 928*d*. The fourth multiplexer 938 can receive differential pair data output signal 914*a* from the data controller 902 as differential pair input signal 928*a*. The fourth multiplexer 938 can receive differential pair display output signal 916*c* from the reordering switch 940 as differential pair input signal 928*c*. A select input 932 and an enable input 934 could determine if differential pair multiplexer output signals 930*a-b* are the differential pair data output signals 914*a-b* or the differential pair display output signals 916*c-d*. The connector (receptacle) 910 can receive the multiplexer output signals 930*a-b*.

The configuration logic 950 can receive an orientation signal 924 from the connector (receptacle) 910. The configuration logic 950 can determine the orientation of a connector (plug) when inserted into the connector (receptacle) 910 based on a value of the orientation signal 924. The configuration logic 950 can provide a configuration control signal 952*a-d* to the select input 918, the enable input 920, the select input 932, and the enable input 934, respectively, based on the determined orientation of the orientation of a connector (plug) when inserted into the connector (receptacle) 910. In addition, the configuration logic 950 can provide a reorder configuration control signal 954 to a reorder control input 946 of the reordering switch 940. Based on the determined orientation of a connector (plug) when inserted into the connector (receptacle) 910 (and the value of the reorder control signal 946), the reordering switch 940 can reorder/switch differential pair display controller output signals 942*a-d* received from the display controller 904. The reordering/switching of the differential pair display controller output signals 942*a-d* can ensure that the appropriate signals are routed to the appropriate pins/ contacts on the connector (receptacle) 910 based on the detected orientation of a connector (plug) when inserted into the connector (receptacle) 910 (based on the value of the orientation signal 924). In some implementations, the reordering switch 940 can be included as part of the display controller 904.

Referring to FIGS. 5A-B and 6A-B, the orientation of a connector (plug) when inserted into the connector (receptacle) can determine the routing of the display controller output signals 942*a-d* to the connector (receptacle) 910. Though shown as a single orientation signal 924, in some implementations, an orientation signal can include more than one input signal to the configuration logic 950.

In a non-limiting example, the data controller 902 can be a USB controller. The differential pair data output signals 914*a-b* can be a differential pair transmit signal and a differential pair receive signal, respectively, for use in high-speed USB communications (e.g., USB 3.0, USB 3.1). The display controller 904 can be a DisplayPort Source that can provide four high-speed lanes (e.g., the differential pair display controller output signals 942*a-d*) that can deliver full DisplayPort performance. The connector (receptacle) 910 can be a USB Type-C connector (receptacle).

In some implementations, the first multiplexer 906 and the second multiplexer 926 can select to output transmit and receive signals (e.g., the differential pair data output signals 914*a-b*, respectively) as differential pair multiplexer output signals 922*a-b*. In addition, the third multiplexer 936 and the fourth multiplexer 938 can select to output the differential pair display output signals 916*c-d* as received from the reordering switch 940 (e.g., the DisplayPort Source output high-speed lane 1 and high-speed lane 0, respectively) as differential pair multiplexer output signals 930*a-b*. Depending on the determined orientation of a connector (plug) inserted into the connector (receptacle) 910, the reordering switch 940 can determine that the differential pair display output signals 916*c-d* and the differential pair data output signals 914*a-b* should be routed to connector inputs 944*c-d* and connector inputs 944*a-b*, respectively, on the connector (receptacle) 910.

In some implementations, the first multiplexer 906 and the second multiplexer 926 can select to output differential pair display output signals 916*a-b* from the reordering switch 940 (e.g., the DisplayPort Source output high-speed lane 3 and high-speed lane 2, respectively) as differential pair multiplexer output signals 922*a-b*. In addition, the third multiplexer 936 and the fourth multiplexer 938 can select to output transmit and receive signals (e.g., the differential pair data output signals 914*a-b*, respectively) as differential pair multiplexer output signals 930*a-b*. Depending on the determined orientation of a connector (plug) inserted into the connector (receptacle) 910, the reordering switch 940 can determine that the differential pair display output signals 916*c-d* and the differential pair data output signals 914*a-b* should be routed to connector inputs 944*c-d* and connector inputs 944*a-b*, respectively, on the connector (receptacle) 910.

In these implementations, a computing device (e.g., the computing device 100) can provide DisplayPort performance and high-speed USB performance. In these implementations, the computing device can be interfaced to/connected to a docking station that can allow the simultaneous transfer of high-speed USB data on the differential pair data output signals 914*a-b* and display data on the differential pair display output signals 916*a-b* or on the differential pair display output signals 816*c-d* to a peripheral device and a display device, respectively.

In some implementations, the first multiplexer 906 and the second multiplexer 926 can select to output high-speed lane 3 and high-speed lane 2 (e.g., the differential pair display output signals 916*a-b*, respectively) as received from the reordering switch 940, which receives the signals from the display controller 904 (the DisplayPort Source) to the connector (receptacle) 810. In addition, the third multiplexer 936 and the fourth multiplexer 938 can select to output high-speed lane 1 and high-speed lane 0 (e.g., the differential pair display output signals 916*c-d*, respectively) as received from the reordering switch 940, which receives the signals from the display controller 904 (the DisplayPort Source output) to the connector (receptacle) 910 as differential pair multiplexer output signals 930*a-b*. Depending on the determined orientation of a connector (plug) inserted into the connector (receptacle) 910, the reordering switch 940 can determine the routing of the differential pair display controller output signals 942*a-d* to the connector (receptacle) 910.

In these implementations, a computing device (e.g., the computing device 100) can provide full DisplayPort performance utilizing an optional DisplayPort Alternate Mode capability of a USB Type-C connector. As described with reference to FIGS. 2, 3, and 4, for example, a connector (plug) on both ends of a cable can be a USB Type-C connector (plug). In this example, one end of the cable can plug into a USB Type-C connector (receptacle) included in a port of the computing device (e.g., the connector (receptacle) 910) and the other end of the cable can plug into a USB Type-C connector (receptacle) included in a display device.

In another example, a display device may include a DisplayPort connector (receptacle) (e.g., a Standard DisplayPort connector, a mini DisplayPort connector). In this example, a connector (plug) on one end of a cable can be a USB Type-C connector (plug) that plugs into a USB Type-C connector (receptacle) included in a port of the computing device (e.g., the connector (receptacle) 710). The other end of the cable can be a DisplayPort connector (plug) (e.g., a Standard DisplayPort connector, a mini DisplayPort connector) that plugs into a DisplayPort connector (receptacle). In another example, a display device may include an HDMI, DVI, or VGA connector (receptacle). For example, circuitry placed between the differential pair display output signals 916*a-d* and the multiplexers 906, 926, 936, and 938 may include a converter that converts the differential pair display output signals 916*a-d* into the signals needed for connection to an HDMI, DVI, or VGA connector (receptacle) included on the display device. In some cases, a converter may be included in each of the multiplexers 906, 926, 936, and 938.

Figure 10:
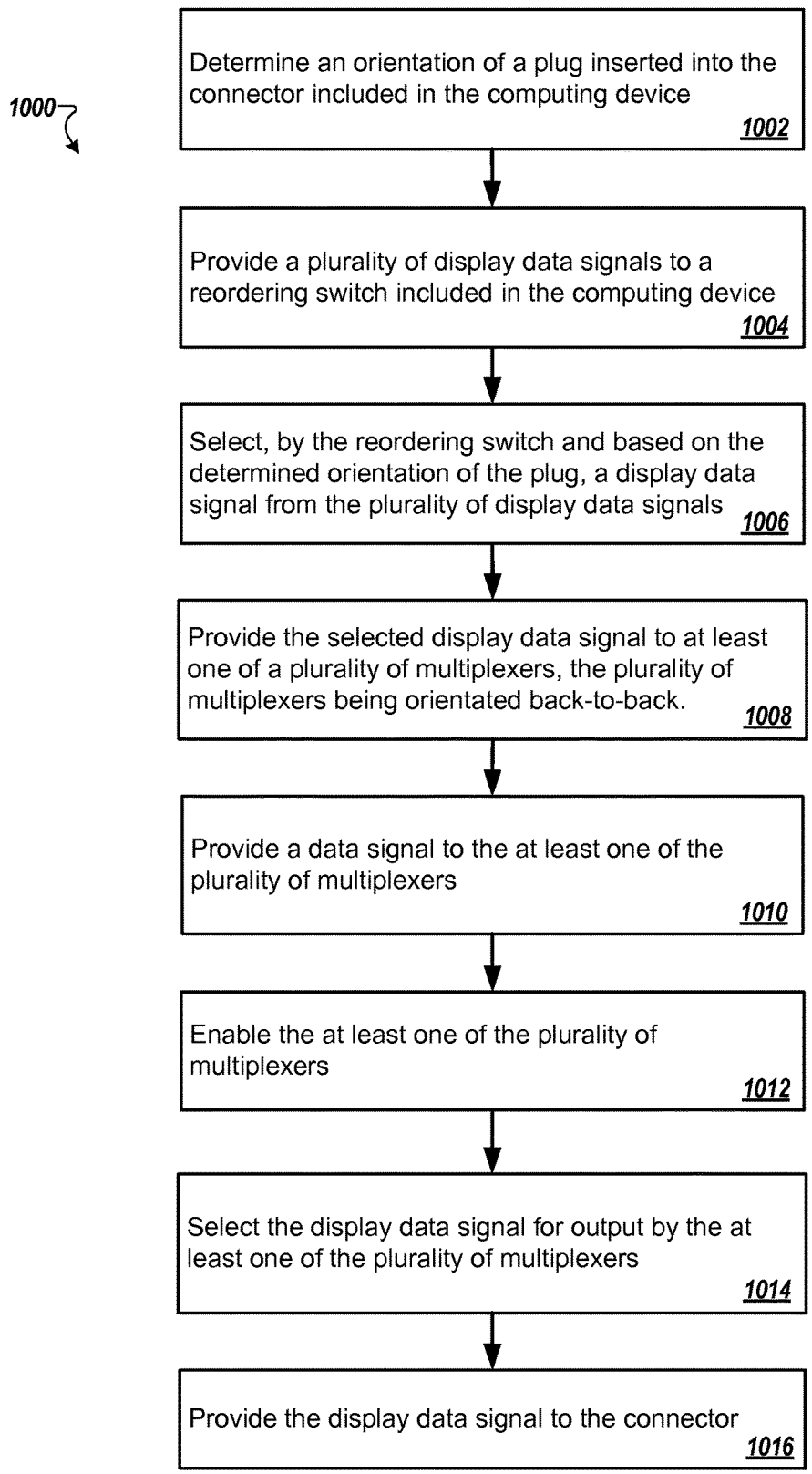
FIG. 10 is a flowchart that illustrates a method for providing signals to contacts on a connector included in a computing device.

FIG. 10 is a flowchart that illustrates a method 1000 for providing signals to contacts on a connector included in a computing device. In some implementations, the systems, methods, and processes described herein can implement the method 1000. For example, the method 1000 can be described referring to FIGS. 1A-C, 2, 3, 4, 5A-B, 6A-B, 7, 8, and 9.

An orientation of a plug inserted into a connector included in the computing device can be determined (block 1002). For example, referring to FIG. 9, the configuration logic 950 can determine the orientation of a connector (plug) when inserted into a connector (receptacle) using the orientation signal 924.

A display controller included in a computing device can provide a plurality of display data signals to a reordering switch included in the computing device (block 1004). For example, referring to FIG. 9, the display controller 904 can provide the differential pair display controller output signals 942*a*-*d* to the reordering switch 940.

The reordering switch, based on the determined orientation of the plug, can select a display data signal from the plurality of display data signals (block 1006). The reordering switch can provide the selected display data signal to at least one of a plurality of multiplexers, the plurality of multiplexers being orientated back-to-back (block 1008). For example, referring to FIG. 9, the reordering switch 940 can provide the differential pair display output signals 916*a*-*d* to the first multiplexer 906, the second multiplexer 926, the fourth multiplexer 938, and the third multiplexer 936, respectively.

A data controller included in the computing device can provide a data signal to the at least one of the plurality of multiplexers (block 1010). For example, referring to FIG. 9, the data controller 902 can provide the differential pair data output signals 914*a*-*b* to the second multiplexer 926 and the first multiplexer 906, respectively. The data controller 902 can provide the differential pair data output signals 914*a*-*b* to the fourth multiplexer 938, and the third multiplexer 936, respectively.

The at least one of the plurality of multiplexers is enabled (block 1012). For example, referring to FIG. 9, the enable input 920 can be set to a value that enables the first multiplexer 906 and the second multiplexer 926, while the enable input 934 can be set to a value that disables the third multiplexer 936 and the fourth multiplexer 938. In another example, referring to FIG. 9, the enable input 920 can be set to a value that disables the first multiplexer 906 and the second multiplexer 926, while the enable input 934 can be set to a value that enables the third multiplexer 936 and the fourth multiplexer 938.

The display data signal is selected for output by the at least one of the plurality of multiplexers (block 1014). For example, referring to FIG. 9, when the first multiplexer 906 and the second multiplexer 926 are enabled, setting a value of the select input 918 to a logic "1" can select the differential pair input signal 912*d* for output as the differential pair multiplexer output signal 922*a*. In addition, when the first multiplexer 906 and the second multiplexer 926 are enabled and the select input is set to a logic "1" value, the differential pair input signal 912*c* is selected for output as the differential pair multiplexer output signal 922*b*. For example, when the first multiplexer 906 and the second multiplexer 926 are enabled, setting a value of the select input 918 to a logic "0" can select the differential pair input signal 912*b* for output as the differential pair multiplexer output signal 922*a*. In addition, when the first multiplexer 906 and the second multiplexer 926 are enabled and the select input is set to a logic "0" value, the differential pair input signal 912*a* is selected for output as the differential pair multiplexer output signal 922*b*.

For example, referring to FIG. 9, when the third multiplexer 936 and the fourth multiplexer 938 are enabled, setting a value of the select input 932 to a logic "1" can select the differential pair input signal 928*d* for output as the differential pair multiplexer output signal 930*a*. In addition, when the third multiplexer 936 and the fourth multiplexer 938 are enabled and the select input is set to a logic "1" value, the differential pair input signal 928*c* is selected for output as the differential pair multiplexer output signal 930*b*. For example, when the third multiplexer 936 and the fourth multiplexer 928 are enabled, setting a value of the select input 932 to a logic "0" can select the differential pair input signal 928*b* for output as the differential pair multiplexer output signal 930*a*. In addition, when the third multiplexer 936 and the fourth multiplexer 938 are enabled and the select input is set to a logic "0" value, the differential pair input signal 928*a* is selected for output as the differential pair multiplexer output signal 930*b*.

The at least one of the plurality of multiplexers provides the display data signal to the connector (block 1016). For example, referring to FIG. 9, the first multiplexer 906 can provide the differential pair display output signal 916*a* to the connector (receptacle) 910 by way of the differential pair multiplexer output signal 922*a*.

For example, referring to FIG. 9, the differential pair display output signal 916*a* (received as the differential pair multiplexer output signal 922*a*) is provided to the RX1 input on the connector by way of the first multiplexer 906 and based on the determined orientation of the plug inserted into the connector (receptacle) 910.

Figure 11:
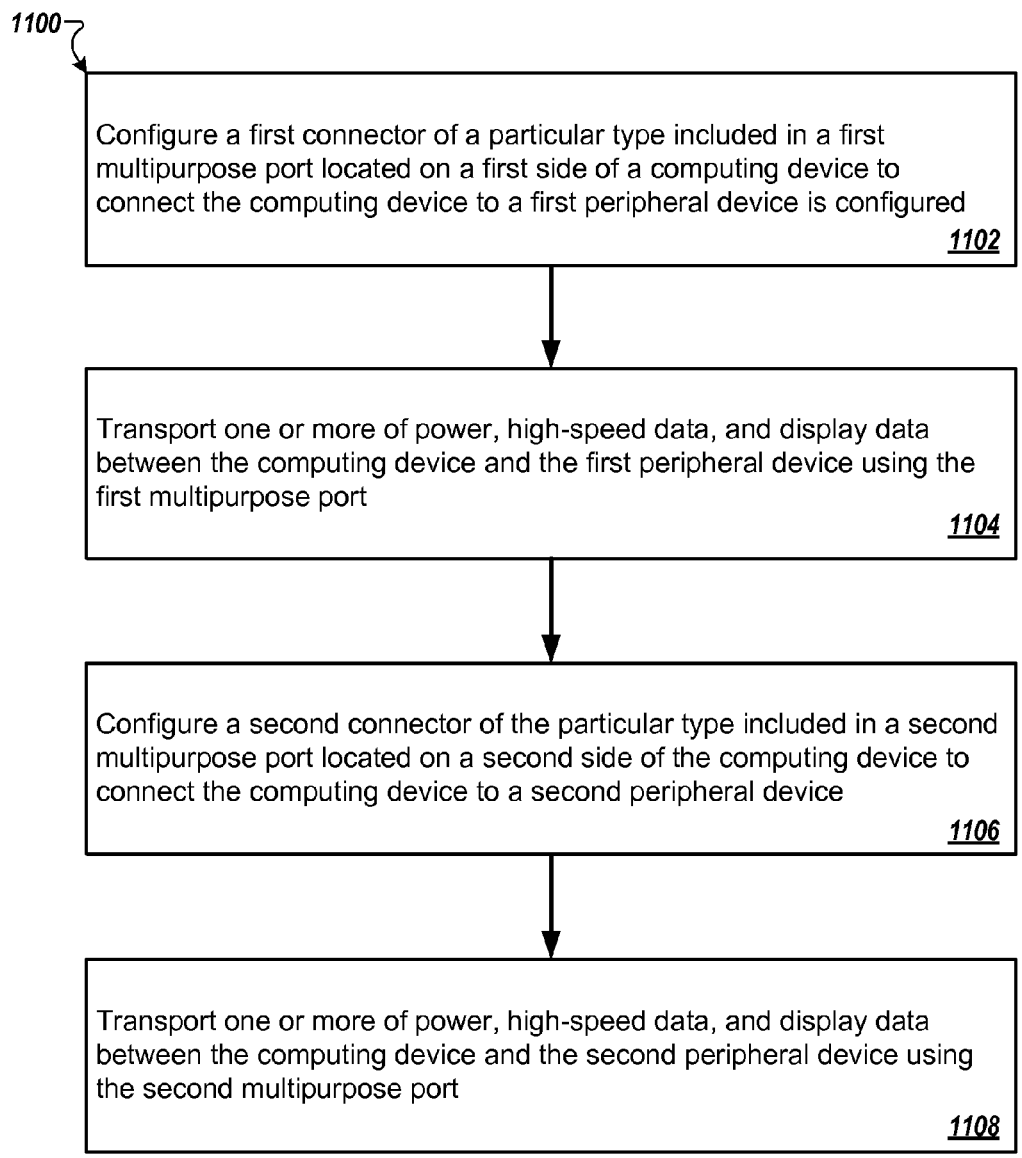
FIG. 11 is a flowchart that illustrates a method for configuring connectors included in a computing device.

FIG. 11 is a flowchart that illustrates a method 1100 for configuring connectors included in a computing device. In some implementations, the systems, methods, and processes described herein can implement the method 1000. For example, the method 1000 can be described referring to FIGS. 1A-C, 2, 3, 4, 5A-B, 6A-B, 7, 8, and 9.

A first connector of a particular type included in a first multipurpose port located on a first side of a computing device to connect the computing device to a first peripheral device is configured (block 1102). One or more of power, high-speed data, and display data is transported between the computing device and the first peripheral device using the first multipurpose port (block 1104). A second connector of the particular type included in a second multipurpose port located on a second side of the computing device to connect the computing device to a second peripheral device is configured (block 1106). One or more of power, high-speed data, and display data is transported between the computing device and the second peripheral device using the second multipurpose port (block 1108).

For example, referring to FIG. 2, the first multipurpose port 210 can transmit and receive data for communicating with the printer 244. The second multipurpose port 220 can provide display data from the computing device 200 to the display device 246. For example, referring to FIG. 3, the second multipurpose port 320 can supply power to the mobile computing device 344. The first multipurpose port 310 can provide display data from the computing device 300 to the display device 346. For example, referring to FIG. 4, the first multipurpose port 410 can provide display data from the computing device 400 to the display device 446. A power adapter 444 can be connected by way of the first cable 450 into the first multipurpose port 410.

Figure 12:
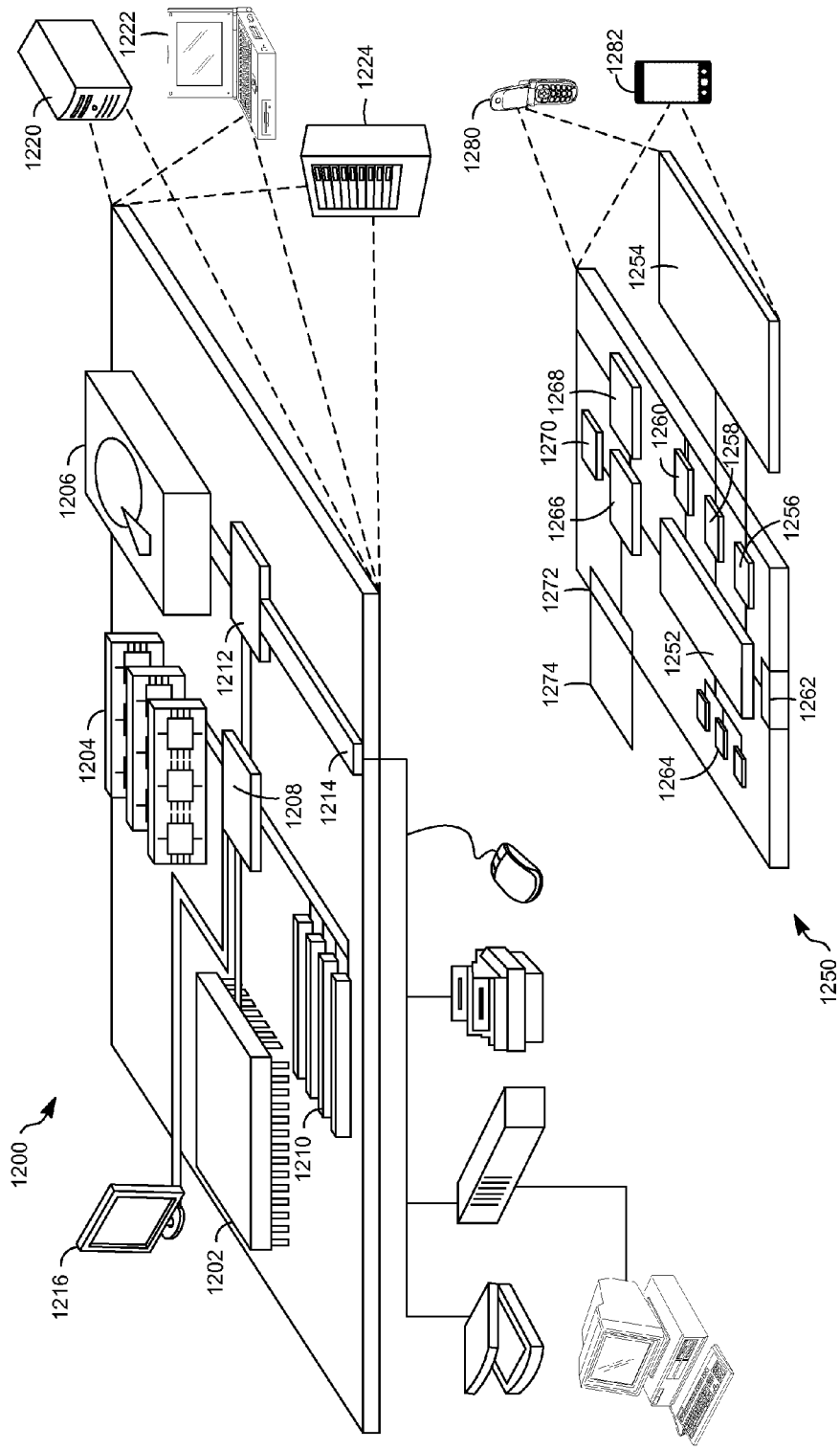
FIG. 12 shows an example of a computer device and a mobile computer device that can be used to implement the techniques described here.

FIG. 12 shows an example of a generic computer device 1200 and a generic mobile computer device 1250, which may be used with the techniques described here. Computing device 1200 is intended to represent various forms of digital computers, such as laptops, desktops, workstations, personal digital assistants, servers, blade servers, mainframes, and other appropriate computers. Computing device 1250 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, such as a magnetic or optical disk.

The storage device 1206 is capable of providing mass storage for the computing device 1200. In one implementation, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1204, the storage device 1206, or memory on processor 1202.

The high speed controller 1208 manages bandwidth-intensive operations for the computing device 1200, while the low speed controller 1212 manages lower bandwidth-intensive operations. Such allocation of functions is exemplary only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing device 1200, 1250, and an entire system may be made up of multiple computing devices 1200, 1250 communicating with each other.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can execute instructions within the computing device 1250, including instructions stored in the memory 1264. The processor may be implemented as a chipset of chips that include separate and multiple analog and digital processors. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT LCD (Thin-Film-Transistor Liquid Crystal Display) or an OLED (Organic Light Emitting Diode) display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provide in communication with processor 1252, so as to enable near area communication of device 1250 with other devices. External interface 1262 may provide, for example, for wired communication in some implementations, or for wireless communication in other implementations, and multiple interfaces may also be used.

The memory 1264 stores information within the computing device 1250. The memory 1264 can be implemented as one or more of a computer-readable medium or media, a volatile memory unit or units, or a non-volatile memory unit or units. Expansion memory 1274 may also be provided and connected to device 1250 through expansion interface 1272, which may include, for example, a SIMM (Single In Line Memory Module) card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provide as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, or memory on processor 1252, that may be received, for example, over transceiver 1268 or external interface 1262.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, WiFi, or other such transceiver (not shown). In addition, GPS (Global Positioning System) receiver module 1270 may provide additional navigation- and location-related wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in the figure. For example, it may be implemented as a cellular telephone 1280. It may also be implemented as part of a smart phone 1282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method for providing signals to contacts on a connector included in a computing device, the method comprising:

determining an orientation of a plug inserted into a connector included in the computing device;

providing, by a display controller included in the computing device, a plurality of display data signals to a reordering switch included in the computing device;

selecting, by the reordering switch and based on the determined orientation of the plug, a display data signal from the plurality of display data signals;

providing, by the reordering switch, the selected display data signal to at least one of a plurality of multiplexers, the plurality of multiplexers being orientated back-to-back;

providing, by a data controller included in the computing device, a data signal to the at least one of the plurality of multiplexers;

enabling the at least one of the plurality of multiplexers;

selecting the display data signal for output by the at least one of the plurality of multiplexers; and providing, by the at least one of the plurality of multiplexers, the display data signal to a contact included on the connector.

2. The method of claim 1, wherein selecting, by the reordering switch and based on the determined orientation of the plug, a display data signal from the plurality of display data signals comprises selecting a respective display data signal from the plurality of display data signals to provide to each of the plurality of multiplexers;

wherein providing, by the reordering switch, the selected display data signal to the at least one of the plurality of multiplexers comprises providing a respective display data signal to each of the plurality of multiplexers;

wherein enabling the at least one of the plurality of multiplexers comprises enabling each of the plurality of multiplexers;

wherein selecting the display data signal for output by the at least one of the plurality of multiplexers comprises selecting the respective display data signal for output by each of the plurality of multiplexers; and wherein providing, by the at least one of the plurality of multiplexers, the display data signal to a contact included on the connector comprises providing the respective display data signals to a respective contact included on the connector.

3. The method of claim 2, wherein the connector is a Universal Serial Bus (USB) Type-C connector, and the method further comprises configuring the connector to operate in a full DisplayPort Alternate mode.

4. The method of claim 1,
wherein selecting, by the reordering switch and based on the determined orientation of the plug, a display data signal from the plurality of display data signals comprises selecting a respective display data signal from the plurality of display data signals to provide to each of the plurality of multiplexers;

wherein providing, by the reordering switch, the selected display data signal to the at least one of the plurality of multiplexers comprises providing respective display data signals to each of the plurality of multiplexers;

wherein providing, by a data controller included in the computing device, a data signal to the at least one of the plurality of multiplexers comprises providing respective data signals to each of the plurality of multiplexers; and wherein enabling the at least one of the plurality of multiplexers comprises enabling each of the plurality of multiplexers.

5. The method of claim 4, further comprising:
selecting respective data signals for output by a first set of the plurality of multiplexers; and
providing, by each multiplexer included in the first set of the plurality of multiplexers, the respective data signals to respective contacts included in the connector based on the determined orientation of the plug;
wherein selecting, by the reordering switch and based on the determined orientation of the plug, a display data signal from the plurality of display data signals comprises selecting respective display data signals to provide to a second set of the plurality of multiplexers;
wherein providing, by the reordering switch, the selected display data signal to at least one of a plurality of multiplexers comprises providing a respective display data signal to a respective multiplexer included in the second set of the plurality of multiplexers; and
wherein providing, by the at least one of the plurality of multiplexers, the display data signal to a contact included on the connector comprises providing the respective display data signals to respective contacts included in the connector.

6. The method of claim 5, wherein the connector is a Universal Serial Bus (USB) Type-C connector, and the method further comprises configuring the connector to operate in a DisplayPort Alternate mode and a high-speed USB data mode.

7. The method of claim 5,
wherein providing the respective data signals to respective contacts included in the a connector comprises providing the respective data signals to respective contacts on a first connector incorporated into a first multipurpose port located on a first side of the computing device; and
wherein providing the respective display data signals to contacts included in the connector comprises providing the respective display data signals to respective contacts on a second connector incorporated into a second multipurpose port located on a second side of the computing device, the second side being opposite to the first side.

8. The method of claim 7, further comprising:
configuring the first connector to provide one or more of power, high-speed data, and display data; and
configuring the second connector to provide one or more of power, high-speed data, and display data.

9. The method of claim 8, wherein configuring the first connector to provide one or more of power, high-speed data, and display data comprises configuring the first connector to provide high-speed data to a first peripheral device connected to the computing device by way of the first connector.

10. The method of claim 9, wherein configuring the second connector to provide one or more of power, high-speed data, and display data comprises configuring the second connector to provide display data to a second peripheral device connected to the computing device by way of the second connector.

11. The method of claim 10, wherein the first peripheral device is a mobile computing device and the second peripheral device is a display device.

12. The method of claim 11, wherein the first connector and the second connector are Universal Serial Bus (USB) Type-C connectors, and wherein the computing device configures the second connector to operate in a DisplayPort Alternate mode.

13. The method of claim 10, wherein a connector included in the first peripheral device and a connector included in the second peripheral device are of a same type of connector as the first connector and the second connector.

14. The method of claim 1, wherein a peripheral device includes a connector, the peripheral device being connected to the computing device by way of the connector included in the computing device, and wherein the connector included in the peripheral device is of a different type than a type of connector for the connector included in the computing device.

15. The method of claim 14, wherein the peripheral device is a display device.

16. The method of claim 1, wherein a peripheral device is connected to the computing device by way of the connector included in the computing device, and wherein the peripheral device provides power to the computing device, the connector included in the computing device being configured to receive the power provided by the peripheral device.

17. A computing device comprising:
a plurality of multiplexers;
a reordering switch coupled to the plurality of multiplexers;
a display controller coupled to the reordering switch;
a data controller coupled to the plurality of multiplexers;
a connector coupled to the plurality of multiplexers,
the display controller providing a plurality of display data signals to the reordering switch, the reordering switch providing at least one of the plurality of display data signals to at least one of the plurality of multiplexers, the data controller providing at least one data signal to at least one of the plurality of multiplexers, and the at least one of the plurality of multiplexers providing the at least one display data signal to a respective at least one contact included on the connector; and configuration logic that detects an orientation of a plug inserted into the connector, provides a signal indicative of the orientation of the plug to each of the plurality of multiplexers, and provides a signal indivative of the orientation of the plug to the reordering switch.

18. The computing device of claim 17, wherein the plurality of multiplexers includes four multiplexers, wherein the reordering switch provides a respective display data signal to each of the four multiplexers, and wherein each of the four multiplexers provides the respective display data signal to a respective contact included on the connector.

19. The computing device of claim 17, wherein the connector is a Universal Serial Bus (USB) Type-C connector, and wherein the computing device configures the connector to operate in a full DisplayPort Alternate mode.

20. The computing device of claim 17, further including a reordering switch,
wherein the plurality of multiplexers includes four multiplexers,
wherein the display controller provides a respective display data signal to each of the four multiplexers by way of the reordering switch,
wherein the data controller provides a respective data signal to each of the four multiplexers, and
wherein each of the four multiplexers provides either the display data signal or the data signal to a contact on the connector.

21. The computing device of claim 20, wherein each of the four multiplexers includes a respective select input and a respective enable input, and wherein providing by each of the four multiplexers either the display data signal or the data signal is determined by a value for the respective select input and a value for the respective enable input for the respective multiplexer.

22. The computing device of claim 20, wherein a first two of the four multiplexers provide a respective display data signal to a first contact on the connector, and wherein a second two of the four multiplexers provide a respective data signal to a second contact on the connector.

23. The computing device of claim 22, wherein the connector is a Universal Serial Bus (USB) Type-C connector, and wherein the computing device configures the connector to operate in a DisplayPort Alternate mode and a high-speed USB data mode.

24. The computing device of claim 17,
wherein the plurality of multiplexers include a first multiplexer, a second multiplexer, a third multiplexer, and a fourth multiplexer,
wherein the first multiplexer is located above the second multiplexer,
wherein the third multiplexer is located above the fourth multiplexer, and
wherein the first multiplexer and the second multiplexer are placed back-to-back with the third multiplexer and the fourth multiplexer.

25. A non-transitory, machine-readable medium having instructions stored thereon, the instructions, when executed by a processor, cause a computing device to:
determine an orientation of a plug inserted into a connector included in the computing device;
provide, by a display controller included in the computing device, a plurality of display data signals to a reordering switch included in the computing device;
select, by the reordering switch and based on the determined orientation of the plug, a display data signal from the plurality of display data signals;
provide, by the reordering switch, the selected display data signal to at least one of a plurality of multiplexers, the plurality of multiplexers being orientated back-to-back;
provide, by a data controller included in the computing device, a data signal to the at least one of the plurality of multiplexers;
enable the at least one of the plurality of multiplexers;
select the display data signal for output by the at least one of the plurality of multiplexers; and
provide, by the at least one of the plurality of multiplexers, the display data signal to a contact included on the connector.

26. The medium of claim 25,
wherein selecting, by the reordering switch and based on the determined orientation of the plug, a display data signal from the plurality of display data signals comprises selecting a respective display data signal from the plurality of display data signals to provide to each of the plurality of multiplexers;
wherein providing, by the reordering switch, the selected display data signal to the at least one of the plurality of multiplexers comprises providing a respective display data signal to each of the plurality of multiplexers;
wherein enabling the at least one of the plurality of multiplexers comprises enabling each of the plurality of multiplexers;
wherein selecting the display data signal for output by the at least one of the plurality of multiplexers comprises selecting the respective display data signal for output by each of the plurality of multiplexers; and
wherein providing, by the at least one of the plurality of multiplexers, the display data signal to a contact included on the connector comprises providing the respective display data signals to a respective contact included on the connector.

* * * * *

UNITED STATES PATENT AND TRADEMARK OFFICE
CERTIFICATE OF CORRECTION

PATENT NO. : 10,152,442 B2  
APPLICATION NO. : 14/634352  
DATED : December 11, 2018  
INVENTOR(S) : Bowers et al.

Page 1 of 1

It is certified that error appears in the above-identified patent and that said Letters Patent is hereby corrected as shown below:

In the Claims

In Column 31, Claim 17, Line 12, delete "indivative" and insert -- indicative -- therefor.

Signed and Sealed this  
Ninth Day of June, 2020

Andrei Iancu  
*Director of the United States Patent and Trademark Office*